US008680203B2

(12) United States Patent
Nozari et al.

(10) Patent No.: US 8,680,203 B2
(45) Date of Patent: Mar. 25, 2014

(54) PROCESS FOR PRODUCING A PARTICULATE NANOCOMPOSITE MATERIAL

(75) Inventors: Samira Nozari, Mannheim (DE); Rainer Dyllick-Brenzinger, Neustadt (DE); Arno Lange, Bad Dürkheim (DE); Stefan Spange, Orlamünde (DE)

(73) Assignee: BASF SE (DE)

( * ) Notice: Subject to any disclaimer, the term of this patent is extended or adjusted under 35 U.S.C. 154(b) by 151 days.

(21) Appl. No.: 13/319,414

(22) PCT Filed: May 7, 2010

(86) PCT No.: PCT/EP2010/056265
§ 371 (c)(1),
(2), (4) Date: Nov. 8, 2011

(87) PCT Pub. No.: WO2010/128144
PCT Pub. Date: Nov. 11, 2010

(65) Prior Publication Data
US 2012/0052300 A1 Mar. 1, 2012

(30) Foreign Application Priority Data
May 8, 2009 (EP) .................................. 09159814

(51) Int. Cl.
C07F 7/00 (2006.01)
C07F 7/04 (2006.01)

(52) U.S. Cl.
USPC .............................. 525/75; 525/918; 524/847

(58) Field of Classification Search
USPC .............................. 526/75; 525/918; 524/847
See application file for complete search history.

(56) References Cited

U.S. PATENT DOCUMENTS

| 4,996,004 | A | 2/1991 | Bucheler et al. | |
|---|---|---|---|---|
| 5,491,192 | A | 2/1996 | Walker et al. | |
| 2009/0155562 | A1 | 6/2009 | Spiegelberg et al. | |
| 2010/0284882 | A1* | 11/2010 | Koch et al. | 423/325 |
| 2010/0294673 | A1* | 11/2010 | Koch et al. | 206/7 |

FOREIGN PATENT DOCUMENTS

| EP | 101007 A2 | 2/1984 |
|---|---|---|
| EP | 1403332 A1 | 3/2004 |
| WO | WO-01/12678 A1 | 2/2001 |
| WO | WO-2004/058859 A1 | 7/2004 |
| WO | WO-2007/028563 A1 | 3/2007 |
| WO | WO-2009/083082 A2 | 7/2009 |
| WO | WO-2009/083083 A1 | 7/2009 |

OTHER PUBLICATIONS

Grund, S., et al., "Zwillingspolymerisation: ein Weg zur Synthese von Nanokompositen", Angew. Chem, vol. 119, (2007), pp. 636-640.
Grund, S., et al., "Nanocomposites Prepared by Twin Polymerization of a Single-Source Monomer", Angew. Chem, Int. Ed. vol. 46, (2007), pp. 628-632.
Mehner, A., et al., "Synthesis of nanosized TiO2 by Cationic Polymerization of (μ4-oxido)-hexakis (μ-furfuryloxo)-octakis(furfuryloxo)-tetra-titanium", Anv. Mater., vol. 20, (2008), pp. 4113-4117.
Spange, S., et al., "Nanostructured Organic-Inorganic Composite Materials by Twin Polymerization of Hybrid Monomers", Adv. Mater., vol. 21, (2009), pp. 2111-2116.

* cited by examiner

Primary Examiner — Kelechi Egwim
(74) Attorney, Agent, or Firm — Novak Druce Connolly Bove +Quigg LLP

(57) ABSTRACT

The present invention relates to a process for producing a particulate nanocomposite material, in which the particles of the nanocomposite material comprise a) at least one inorganic or organo(semi)metallic phase which comprises at least one (semi)metal M; and
b) at least one organic polymer phase.

The invention also relates to the nanocomposite materials obtainable by this process.

The process comprises the polymerization of at least one monomer MM which has at least one first cationically polymerizable monomer unit A which has a metal or semimetal M, and at least one second cationically polymerizable organic monomer unit B which is joined to the polymerizable unit A via at least one, e.g. 1, 2, 3, or 4, covalent chemical bond, under cationic polymerization conditions under which both the polymerizable monomer unit A and the polymerizable unit B polymerize with breakage of the bond or bonds between A and B, wherein the polymerization is performed in an aprotic solvent in which the nanocomposite material is insoluble, in the presence of at least one polymerization initiator and of at least one further substance selected from α) at least one surface-active substance and β) at least one particulate material.

24 Claims, No Drawings

PROCESS FOR PRODUCING A PARTICULATE NANOCOMPOSITE MATERIAL

CROSS-REFERENCE TO RELATED APPLICATIONS

This application is a national stage application (under 35 U.S.C. §371) of PCT/EP2010/056265, filed May 7, 2010, which claims benefit of EP 09159814.4, filed May 8, 2009.

BACKGROUND OF THE INVENTION

The present invention relates to a process for producing a particulate nanocomposite material, in which the particles of the nanocomposite material comprise
a) at least one inorganic or organo(semi)metallic phase which comprises at least one (semi)metal M; and
b) at least one organic polymer phase.

The invention also relates to the nanocomposite materials obtainable by this process.

Nanocomposite materials, i.e. polymer-based composite materials which comprise, in the organic polymer phase, an inorganic phase, for example an inorganic (semi)metal oxide phase with dimensions below 500 nm, especially below 100 nm (hereinafter, also nanoscale phase or, in the case of a particulate phase, nanoscale particles), owing to the large interface between the nanoscale inorganic phase and the organic polymer phase, possess a high potential with regard to their chemical, physical and mechanical properties, which cannot be achieved by milli- or microscale dispersions of conventional inorganic constituents in polymer phases (R. P. Singh, et al., *J. Mater. Sci.* 2002, 37, 781).

The processes known to date for producing inorganic-organic nanocomposites are based on direct mixing of nanoparticles or exfoliated sheet silicates with a polymer in solution or the melt, the in situ preparation of the organic phase by polymerizing organic monomers in the presence of inorganic nanoparticles or exfoliated sheet silicates, sol-gel techniques and combinations of these measures (see, for example, for incorporation of nanoparticles into a polymer melt: Garcia, M.; et al., *Polymers for Advanced Technologies* 2004, 15, 164; for polymerization of organic monomers in the presence of inorganic nanoparticles or exfoliated sheet silicates see: M. C. Kuo et al., *Materials Chemistry and Physics* 2005, 90(1), 185; A. Maity et al., *Journal of Applied Polymer Science* 2004, 94(2), 803; Y. Liao et al. (*Polymer International* 2001, 50(2), 207; and WO 2001/012678; for preparation of an oxide phase by hydrolysis of oligomeric alkoxysiloxanes in a polymer solution or melt see WO 2004/058859 and WO 2007/028563).

The established prior art methods are associated with a series of disadvantages. Firstly, many of them remain restricted to composites of organic polymers which are either soluble in organic solvents or melt without decomposition. In addition, it is generally possible in this way only to introduce small amounts of inorganic phase into the nanocomposite material. Owing to the usually high agglomeration of the nanoparticles and the enormously high shear forces which are necessary as a result, fine distribution of the nanoparticles in a relatively large amount is barely possible. A great disadvantage of nanocomposite production by in situ preparation of the organic polymer phase in the presence of nanoparticles is the formation of nanoparticle agglomerates which occurs, such that inhomogeneous products form. As a result, the advantage of the nanoparticles, that of forming extensive interfaces with the polymer as a result of their large surface area, cannot be utilized. In the case of use of pulverulent nanofillers, owing to the small particle size, there is additionally a high risk to health during compounding owing to the dust formation which occurs and the ability of the nanoparticles to reach the lungs. The in situ preparation of the inorganic phase by a sol-gel process in a polymer melt or solution generally leads to poorly reproducible results or requires complex measures to control the hydrolysis conditions.

Spange et al., Angew. Chem. Int. Ed., 46 (2007) 628-632 describe a novel route to nanocomposite materials by cationic polymerization of tetrafurfuryloxysilane TFOS and difurfuryloxydimethylsilane DFOS according to the following schemes:

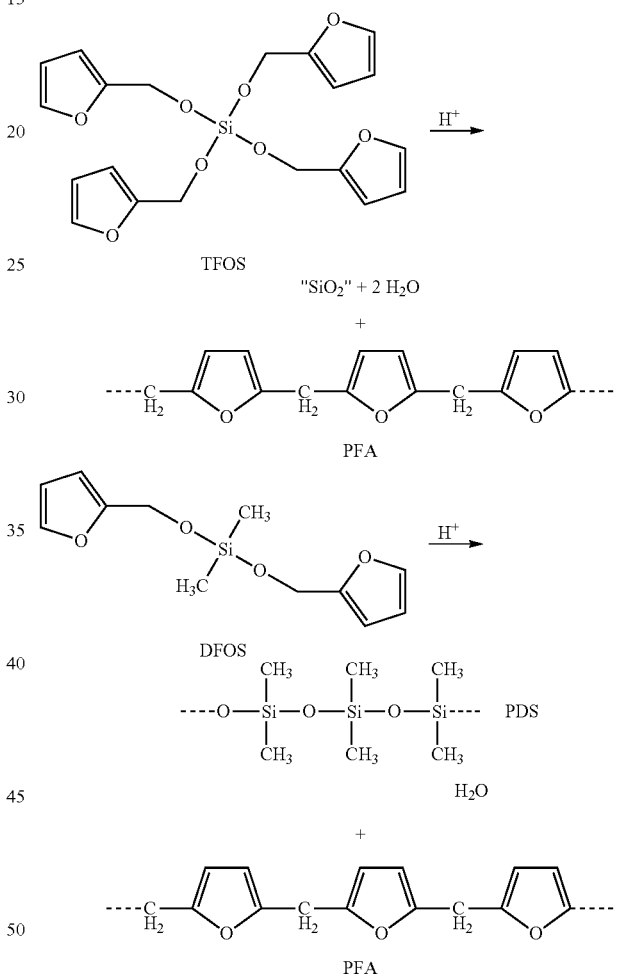

Spange et al. propose the term "twin polymerization" for this kind of polymerization.

The polymerization of TFOS under cationic conditions forms a composite material which has a silicon dioxide phase and an organic polymer phase composed of polyfurfuryl alcohol PFA. The dimensions of the phase domains in the composite material thus obtained are in the region of a few nanometers. In addition, the phase domains of the silicon dioxide phase and the phase domains of the PFA phase have a co-continuous arrangement, i.e. both the PFA phase and the $SiO_2$ phase penetrate one another and essentially do not form any discontinuous regions. The distances between adjacent phase interfaces or the distances between the domains of adjacent identical phases are extremely small and are on average not more than 10 nm. There is no macroscopically visible separation in discontinuous domains of the particular phase.

It is assumed that the specific phase arrangement and the small distances between adjacent phases are a consequence firstly of the kinetic coupling of the polymerization of the furfuryl units, and secondly of the formation of the silicon dioxide. Consequently, the phase constituents form more or less synchronously and there is a phase separation into the inorganic phase and the organic phase as early as during the polymerization of TFOS. In the course of polymerization of DFOS, in contrast, no formation of a composite material is observed. Instead, PFA and oligomeric dimethylsiloxane are formed, the latter separating out as an oil.

The twin polymerization described by Spange et al. solves a series of problems in the production of nanocomposite materials and especially avoids the use of nanomaterials. However, the nanocomposite materials described by Spange et al. are obtained as coarse-particle materials or as monoliths and are therefore unsuitable or disadvantageous for many applications. Comminution of the material described is associated with cost and inconvenience, and harbors the risk that the energy introduced in the course of comminution leads to an enlargement of the phase regions, such that the valuable properties of the material are lost. In addition, the comminution generally leads to very inhomogeneous particle size distributions, and fine dusts can arise, which can be problematic not least for hygiene reasons.

It has been found that the twin polymerization described by Spange et al. is a novel polymerization principle. In the context of this invention, a twin polymerization is understood to mean the polymerization of a monomer MM (called a twin monomer) which has
- at least one first, generally cationically polymerizable monomer unit A which comprises a metal or semimetal M (in TFOS, the $SiO_4$ unit), and
- at least one second, generally cationically polymerizable organic monomer unit B (in TFOS, the furfuryl radicals) which is joined to the polymerizable unit A via at least one covalent chemical bond, under polymerization conditions, generally under cationic polymerization conditions, under which both the polymerizable monomer unit A and the polymerizable unit B polymerize with breakage of the bond between A and B. Accordingly, the polymerizable units A and B are selected such that they polymerize under the same conditions.

For instance, the prior patent application PCT/EP 2008/010169 by this applicant describes a twin polymerization of optionally substituted 2,2'-spiro[4H-1,3,2-benzodioxasilin] (referred to hereinafter as SPISI) under cationic polymerization conditions to give a nanocomposite material which comprises an organic phenol-formaldehyde polymer phase and a silicon dioxide phase, and has the properties described by Spange. Nor is any process for producing particulate materials described here.

DETAILED DESCRIPTION OF THE INVENTION

There is therefore a need for a process for producing a nanocomposite material, comprising:
a) at least one inorganic or organo(semi)metallic phase which comprises at least one (semi)metal M; and
b) at least one organic polymer phase;
which affords the nanocomposite material in particulate form. The process should especially be suitable for producing particulate nanocomposite materials in which the particles of the nanocomposite material have dimensions less than 5 μm, particularly not more than 2 μm, particularly not more than 1 μm, especially not more than 500 nm.

It has now been found that, surprisingly, such a material can be produced by a twin polymerization process when a cationically polymerizable twin monomer is polymerized in an aprotic solvent in which the nanocomposite material is insoluble but the monomer is at least partly soluble, in the presence of at least one polymerization initiator and of at least one further substance which is selected from
α) at least one surface-active substance and
β) at least one particulate material.

In this way, a suspension of the particulate nanocomposite material in the aprotic solvent is obtained, from which the particulate nanocomposite material can be isolated as a fine powder by removing the aprotic solvent.

It has also been found that such a material can be produced by a twin polymerization process when a cationically polymerizable twin monomer is carried out in an aprotic solvent in which the nanocomposite material is insoluble but the monomer is at least partly soluble, in the presence of at least one polymerization initiator, and the polymerization product is treated in the presence of at least one surface-active substance with a solution of a base in a protic solvent. In this way, a fine dispersion of the nanocomposite material in the protic solvent is obtained, from which the particulate nanocomposite material can be isolated as a fine powder by removing the protic solvent.

Accordingly, the present invention relates to a process for producing a particulate nanocomposite material, in which the particles of the nanocomposite material comprise
a) at least one inorganic or organo(semi)metallic phase which comprises at least one (semi)metal M; and
b) at least one organic polymer phase;
by polymerizing at least one monomer MM which has
- at least one first cationically polymerizable monomer unit A which has a metal or semimetal M, and
- at least one second cationically polymerizable organic monomer unit B which is joined to the polymerizable unit A via at least one, e.g. 1, 2, 3 or 4, covalent chemical bond, under cationic polymerization conditions under which both the polymerizable monomer unit A and the polymerizable unit B polymerize with breakage of the bond or bonds between A and B,
wherein the polymerization is performed in an aprotic solvent in which the nanocomposite material is insoluble, in the presence of at least one polymerization initiator and of at least one further substance selected from
α) at least one surface-active substance and
β) at least one particulate material.

Accordingly, the present invention also relates to a process for producing a particulate nanocomposite material, preferably in the form of a dispersion in a protic solvent, in which the particles of the nanocomposite material comprise
a) at least one inorganic or organo(semi)metallic phase which comprises at least one (semi)metal M; and
b) at least one organic polymer phase;
by polymerizing at least one monomer MM which has
- at least one first cationically polymerizable monomer unit A which has a metal or semimetal M, and
- at least one second cationically polymerizable organic monomer unit B which is joined to the polymerizable unit A via at least one, e.g. 1, 2, 3 or 4, covalent chemical bond, under cationic polymerization conditions under which both the polymerizable monomer unit A and the polymerizable unit B polymerize with breakage of the bond or bonds between A and B,
wherein the polymerization is performed in an aprotic solvent in which the nanocomposite material is insoluble but the monomer is at least partly soluble, in the presence of at least one polymerization initiator, and the polymerization product is treated in the presence of at least one surface-active substance with a solution of a base in a protic solvent.

These processes afford, with high yields and good reproducibility, a particulate nanocomposite material, i.e. the polymer is present in the form of discrete particles with dimensions in the micrometer or even nanometer range. Typical mean particle sizes (weight average) are less than 5 μm, frequently not more than 2 μm, particularly not more than 1000 nm and especially not more than 500 nm. The particles of the resulting polymer have both an inorganic or organo (semi)metallic phase which comprises at least one (semi) metal M and results from the polymerization of the monomer unit A, and an organic polymer phase which results from the polymerization of the monomer unit B. Within the particles, the different phases have a co-continuous arrangement, the phase domains of identical phases having average distances up to 100 nm, frequently up to 40 nm, especially up to 10 nm.

According to the invention, the production of the nanocomposite material comprises a polymerization of the monomers MM in an aprotic solvent in which the nanocomposite material formed is insoluble (solubility<1 g/l at 25° C.). This results in the formation of particles of the polymer material under polymerization conditions. It is assumed that the use of an aprotic solvent in which the nanocomposite material formed in the polymerization is insoluble promotes particle formation in principle. When the polymerization is performed in the presence of the surface-active substance or of the particulate inorganic material, the formation of the particles is probably controlled by the presence of the surface-active substance or of the particulate inorganic material, and this prevents the formation of a coarse-particle material. When the polymerization is not performed in the presence of the surface-active substance or of the particulate inorganic material, such control does not take place, resulting in agglomeration of the particles of the nanocomposite material which have formed as primary products due to the insolubility of the composite material in the polymerization medium. However, this agglomeration is suppressed by treatment of the polymerization product in the presence of at least one surface-active substance with a solution of a base in a protic solvent to obtain a fine dispersion of the nanocomposite material in the protic solvent, from which the particulate nanocomposite material can be isolated as a fine powder by removing the protic solvent.

It will be appreciated that the measures of polymerizing the monomers MM in the presence of the surface-active substance and of the particulate inorganic material can also be combined with the measure of treatment of the polymerization product in the presence of at least one surface-active substance with a solution of a base in a protic solvent with one another.

The aprotic solvent is selected such that the monomer is at least partly soluble. This is understood to mean that the solubility of the monomer in the solvent under polymerization conditions is at least 50 g/l, especially at least 100 g/l. In general, the organic solvent is selected such that the solubility of the monomers at 20° C. is 50 g/l, especially at least 100 g/l. More particularly, the solvent is selected such that the monomers are substantially or completely soluble therein, i.e. the ratio of solvent to monomer MM is selected such that, under polymerization conditions, at least 80%, especially at least 90% or the entirety of the monomers MM is present in dissolved form.

"Aprotic" means that the solvent used for polymerization comprises essentially no solvents which have one or more protons which are bonded to a heteroatom such as O, S or N and are thus more or less acidic. The proportion of protic solvents in the organic solvents used for the polymerization is accordingly less than 10% by volume, particularly less than 1% by volume and especially less than 0.1% by volume, based on the total amount of organic solvent. The polymerization of the monomers MM is performed in the substantial absence of water, i.e. the concentration of water at the start of the polymerization is less than 0.1% by weight, based on the amount of organic solvent used.

The solvent may be inorganic or organic or be a mixture of inorganic and organic solvents. It is preferably an organic solvent.

Examples of suitable aprotic organic solvents are hydrocarbons, which may be aliphatic, cycloaliphatic or aromatic, and mixtures thereof with halogenated hydrocarbons. Preferred solvents are hydrocarbons, e.g. acyclic hydrocarbons having generally 2 to 8 and preferably 3 to 8 carbon atoms, especially alkanes such as ethane, iso- and n-propane, n-butane and isomers thereof, n-pentane and isomers thereof, n-hexane and isomers thereof, n-heptane and isomers thereof, and n-octane and isomers thereof, cycloalkanes having 5 to 8 carbon atoms, such as cyclopentane, methylcyclopentane, cyclohexane, methylcyclohexane, cycloheptane, acyclic alkenes having preferably 2 to 8 carbon atoms, such as ethene, iso- and n-propene, n-butene, n-pentene, n-hexene and n-heptene, cycloalkenes such as cyclopentene, cyclohexene and cycloheptene, aromatic hydrocarbons such as benzene, toluene, xylenes, mesitylene, ethylbenzene, cumene (2-propylbenzene), isocumene (1-propylbenzene) and tert-butylbenzene. Preference is also given to mixtures of the aforementioned hydrocarbons with halogenated hydrocarbons, such as halogenated aliphatic hydrocarbons, for example such as chloromethane, dichloromethane, trichloromethane, chloroethane, 1,2-dichloroethane and 1,1,1-trichloroethane and 1-chlorobutane, and halogenated aromatic hydrocarbons such as chlorobenzene, 1,2-dichlorobenzene and fluorobenzene. Preferably, the proportion of the hydrocarbons in the mixtures is at least 50% by volume, particularly at least 80% by volume and especially at least 90% by volume, based on the total amount of organic solvent.

In a preferred embodiment of the invention, the organic solvent used for polymerization comprises at least one aromatic hydrocarbon, especially at least one alkylaromatic such as toluene, xylene and xylene mixtures, 1,2,4-trimethylbenzene, mesitylene, ethylbenzene, cumene, isocumene and tert-butylbenzene, and mixtures of these solvents. In this embodiment, the organic solvent comprises the aromatic hydrocarbon, especially alkylaromatic, preferably in an amount of at least 50% by volume, particularly at least 80% by volume and especially at least 90% by volume, based on the total amount of organic solvent. The remaining amount of organic solvents is selected in this embodiment preferably from alkanes and cycloalkanes.

Examples of inorganic aprotic solvents are especially supercritical carbon dioxide, carbon oxide sulfide, carbon disulfide, nitrogen dioxide, thionyl chloride, sulfuryl chloride and liquid sulfur dioxide, the three latter solvents also being able to act as polymerization initiators.

The monomers MM are polymerized in the presence of a polymerization initiator. The polymerization initiator is selected such that it initiates or catalyzes a cationic polymerization of the monomer units A and B. Accordingly, in the course of polymerization of the monomers MM, the monomer units A and B polymerize synchronously. The term "synchronously" does not necessarily mean that the polymerization of the first and second monomer units proceeds at the same rate. Instead, "synchronously" means that the polymerization of the first and second monomer units is coupled kinetically and is triggered by the cationic polymerization conditions.

Suitable polymerization initiators are in principle all substances which are known to catalyze cationic polymerizations. These include protic acids (Brønsted acids) and aprotic Lewis acids. Preferred protic catalysts are Brønsted acids, for example organic carboxylic acids, for example trifluoroacetic acid or lactic acid, and especially organic sulfonic acids such as methanesulfonic acid, trifluoromethanesulfonic acid or toluenesulfonic acid. Likewise suitable are inorganic Brønsted acids such as HCl, $H_2SO_4$ or $HClO_4$. The Lewis acids used may, for example, be $BF_3$, $BCl_3$, $SnCl_4$, $TiCl_4$, or $AlCl_3$. The use of Lewis acids bound in complex form or dissolved in ionic liquids is also possible. The polymerization initiator is used typically in an amount of 0.1 to 10% by weight, preferably 0.5 to 5% by weight, based on the monomer MM.

In a first embodiment, the process according to the invention is performed in the presence of at least one surface-active substance. Useful surface-active substances in principle include all substances which are suitable for lowering the surface energy of the particles of the nanocomposite material in the polymerization medium. These in principle include all organic and organometallic compounds which have at least one hydrophobic group and at least one hydrophilic group, and which are also referred to hereinafter as emulsifiers. Instead of the hydrophilic group, the surface-active substances may also have a polymerizable group which is copolymerizable with the unit A and/or the unit B of the monomers MM. Such substances are also referred to hereinafter as polymerizable emulsifiers. The surface-active substances also include polymeric substances which have hydrophobic repeat units and hydrophilic repeat units and/or amphiphilic repeat units having at least one hydrophobic group and at least one hydrophilic group, and which are also referred to hereinafter as protective colloids. In contrast to emulsifiers whose molecular weight (number average) typically does not exceed a value of 1500 daltons, protective colloids have a molecular weight (number average) above 1500 daltons.

Surface-active substances are known to those skilled in the art, for example from E. Kissa et al., Fluorinated Surfactants and Repellents, Surfactant Science Series 97, Marcel Dekker, New York 2001, K. Kosswig et al, Die Tenside, Carl Hanser Verlag, Munich, 1993, Römpp, Lexikon Chemie, 10th edition, Georg Thieme Verlag, Stuttgart 1999, p. 4434-4440 and literature cited there.

Suitable hydrophobic groups are hydrocarbon radicals and fluorinated hydrocarbon radicals having at least 6, especially at least 7 or at least 8 carbon atoms, for example 6 to 200, especially 7 to 100 or 8 to 80 carbon atoms. The optionally fluorinated hydrocarbon radical may be aliphatic, cycloaliphatic, aromatic or araliphatic. The hydrophobic groups of the surface-active substances preferably comprise at least one aliphatic, aromatic or araliphatic hydrocarbon radical having at least 6, especially at least 7 or at least 8 carbon atoms, for example 6 to 200, especially 7 to 100 or 8 to 80 carbon atoms, and/or at least one aliphatic fluorinated hydrocarbon radical having at least 6, especially at least 7 or at least 8 carbon atoms, for example 6 to 200, especially 7 to 100 or 8 to 80 carbon atoms. Examples of preferred hydrophobic groups are alkyl radicals having 6 to 200, especially 7 to 100 or 8 to 80 carbon atoms, and also mono-, di- or trialkyl-substituted phenyl radicals, especially monoalkylphenyl radicals, in which the alkyl radicals have a total of 6 to 200, especially 7 to 100 or 8 to 80 carbon atoms. The alkyl groups may be linear or branched and may be derived, for example, from fatty alcohols, oxo alcohols, or from olefin oligomers, for example from oligo- or polyisobutene. Suitable hydrophobic groups are additionally oligo- and poly(dialkylsiloxane) groups, especially oligo- and polydimethylsiloxane groups having generally at least 2, for example 2 to 50, dialkylsiloxane units.

Useful hydrophilic groups include anionic, cationic or nonionic hydrophilic groups. Examples of anionic hydrophilic groups are sulfonate groups, carboxylate groups and phosphonate groups, where the sulfonate groups and phosphonate groups may be bonded directly, i.e. to the sulfur atom or the phosphorus atom, or via oxygen (sulfate groups or phosphate groups). Examples of cationic groups are trimethylammonium and triethylammonium groups, N-pyridinium groups and N-methyl-N-imidazolinium groups. Examples of hydrophilic nonionic groups are oligo- and poly-$C_2$-$C_3$-alkylene oxide groups such as oligo- and polyethylene oxide groups and oligo- and poly(ethylene oxide-co-propylene oxide) groups having generally at least 2, for example 2 to 100, $C_2$-$C_3$-alkylene oxide units, and mono- or oligosaccharide groups or poly-hydroxy-functionalized groups, preference being given to oligo- and poly-$C_2$-$C_3$-alkylene oxide groups.

Suitable hydrophobic repeat units in protective colloids are those which are derived from monomers which have a low water solubility, for example a water solubility of less than 20 g/l at 20° C., and which generally do not have any of the aforementioned hydrophilic groups. Suitable hydrophilic repeat units in protective colloids are those which are derived from hydrophilic monomers which have a high water solubility, for example a water solubility of at least 50 g/l at 20° C., and which generally have at least one hydrophilic group, especially at least one anionic group or a nonionic hydrophilic group as defined above. Amphiphilic repeat units are those which are derived from monomers which have both a hydrophobic hydrocarbon group having at least 6 carbon atoms, for example an alkyl group having at least 6 carbon atoms or a phenyl group, and at least one hydrophilic group, as defined above.

Useful polymerizable groups include especially those groups which have a metal atom M, especially one of the metal atoms M mentioned as preferred, and a polymerizable B group. Examples of such groups are those of the formulae X and Xa:

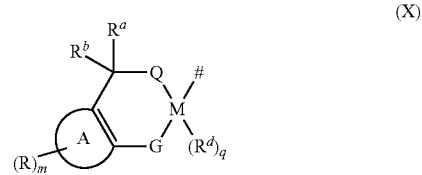

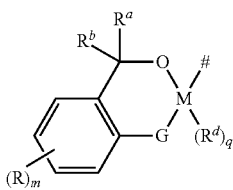

In formula X, the variables are each defined as follows:
# is the connection to the hydrophobic radical;
M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably B, Si, Ti, Zr or Sn, especially Si;
A is an aromatic or heteroaromatic ring fused to the double bond;
m is 0, 1 or 2, especially 0;
G is O, S or NH, particularly O or NH and especially O;
Q is O, S or NH, especially O;
R radicals are each independently selected from halogen, CN, $C_1$-$C_6$-alkyl, $C_1$-$C_6$-alkoxy and phenyl, and are especially methyl or methoxy;
$R^a$, $R^b$ are each independently selected from hydrogen and methyl, or $R^a$ and $R^b$ together are an oxygen atom, and are especially both hydrogen;
$R^d$ is $C_1$-$C_4$-alkyl, especially methyl.
In formula Xa, the variables are each defined as follows:
# is the connection to the hydrophobic radical;
M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably B, Si, Ti, Zr or Sn, especially Si;
m is 0, 1 or 2, especially 0;
G is O, S or NH, particularly O or NH and especially O;
R radicals are each independently selected from halogen, CN, $C_1$-$C_6$-alkyl, $C_1$-$C_6$-alkoxy and phenyl, and are especially methyl or methoxy;
$R^a$, $R^b$ are each independently selected from hydrogen and methyl, or $R^a$ and $R^b$ together are an oxygen atom, and are especially both hydrogen;
$R^d$ is $C_1$-$C_4$-alkyl, especially methyl.

In a preferred embodiment of the invention, the surface-active substance comprises at least one anionic surface-active compound, said compounds also being referred to hereinafter as anionic emulsifiers, and optionally one or more nonionic surface-active substances, also referred to hereinafter as non-ionic emulsifiers.

Anionic emulsifiers generally have, as well as at least one hydrophobic group, for example at least one aliphatic group or araliphatic group having at least 6 carbon atoms, as defined above, or at least one oligo- or poly(alkylsiloxane) group, as defined above, at least one anionic group, for example 1 or 2 anionic groups, which are selected, for example, from sulfonate groups, carboxylate groups and phosphonate groups, where the sulfonate groups and phosphonate groups may also be present as sulfate groups and phosphate groups respectively. Preferred inorganic anionic emulsifiers have 1 or 2 sulfonate or sulfate groups.

The anionic emulsifiers include aliphatic carboxylic acids having generally at least 10 carbon atoms and salts thereof, especially the ammonium and alkali metal salts thereof, aliphatic, araliphatic and aromatic sulfonic acids having generally at least 6 carbon atoms and salts thereof, especially the ammonium and alkali metal salts thereof, sulfuric monoesters of ethoxylated alkanols and alkylphenols and salts thereof, especially the ammonium and alkali metal salts thereof, and also alkyl, aralkyl and aryl phosphates including phosphoric monoesters of alkanols and alkylphenols and salts thereof, especially the ammonium and alkali metal salts thereof.

Preferred anionic emulsifiers are:
  alkali metal and ammonium salts of dialkyl esters of sulfosuccinic acid (alkyl radical: $C_8$ to $C_{16}$),
  alkali metal and ammonium salts of alkyl sulfates (alkyl radical: $C_8$ to $C_{16}$),
  alkali metal and ammonium salts of sulfuric monoesters of ethoxylated alkanols (degree of ethoxylation: 4 to 30, alkyl radical: $C_8$ to $C_{18}$),
  alkali metal and ammonium salts of sulfuric monoesters of ethoxylated alkylphenols (EO: 3 to 50, alkyl radical: $C_4$ to $C_{16}$),
  alkali metal and ammonium salts of alkylsulfonic acids (alkyl radical: $C_{12}$ to $C_{18}$),
  alkali metal and ammonium salts of alkylarylsulfonic acids (alkyl radical: $C_9$ to $C_{18}$),
  compounds of the general formula

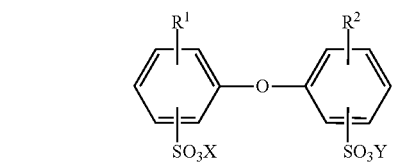

in which $R^1$ and $R^2$ are each hydrogen or $C_4$- to $C_{18}$-alkyl and are not both hydrogen, and X and Y may each be alkali metal ions and/or ammonium ions. $R^1$, $R^2$ are preferably each linear or branched alkyl radicals having 6 to 14 carbon atoms or hydrogen and especially having 6, 12 and 16 carbon atoms, where $R^1$ and $R^2$ are not both simultaneously hydrogen. X and Y are preferably sodium, potassium or ammonium ions, particular preference being given to sodium. Particularly advantageous compounds are those in which X and Y are each sodium, $R^1$ is a branched alkyl radical having 12 carbon atoms and $R^2$ is hydrogen or has one of the definitions specified for $R^1$ other than hydrogen. Frequently, technical grade mixtures which have a proportion of 50 to 90% by weight of the monoalkylated product are used, for example Dowfax® 2A1 (trademark of Dow Chemical Company).

Among the aforementioned anionic emulsifiers, the following are particularly preferred:
  alkali metal and ammonium salts of dialkyl esters of sulfosuccinic acid (alkyl radical: $C_8$ to $C_{16}$), and
  alkali metal and ammonium salts of alkyl sulfates (alkyl radical: $C_8$ to $C_{16}$), and mixtures thereof.

Examples of suitable nonionic emulsifiers are typically ethoxylated alkanols having 8 to 36 carbon atoms in the alkyl radical, ethoxylated mono-, di- and trialkylphenols having typically 4 to 12 carbon atoms in the alkyl radicals, the ethoxylated alkanols and alkylphenols typically having a degree of ethoxylation in the range from 2 to 100, especially 3 to 50. Examples of suitable nonionic surface-active compounds are also ethoxylated oligo- and poly(dialkylsiloxanes), especially ethoxylated oligo- and poly(dimethylsiloxanes), these compounds having at least 2, for example 2 to 50, dialkylsiloxane units and a degree of ethoxylation in the range from 2 to 100, especially 3 to 50.

In another embodiment, the surface-active substance comprises at least one compound which has a cationic polymerizable group which is copolymerizable with the monomer unit A and/or B, for example one of the X or Xa groups. Such compounds are also referred to hereinafter as polymerizable emulsifiers. In addition to the cationically polymerizable group, the polymerizable emulsifier has at least one hydrophobic radical, preferably an alkyl group having at least 6 carbon atoms, for example 6 to 200 carbon atoms, especially 10 to 100 carbon atoms. Examples of polymerizable emulsifiers are those of the formula X-Hb in which X is a radical of the formula X, especially of the formula Xa, and Hb is a hydrophobic radical, especially an alkyl group having at least 6 carbon atoms, for example 6 to 200 carbon atoms, especially 10 to 100 carbon atoms.

Of course, the polymerizable emulsifiers can also be used in combination with other surface-active substances, for example in combination with one or more anionic and/or nonionic emulsifiers.

In a further embodiment of the invention, the surface-active substance comprises at least one anionic or nonionic surface-active polymer, said polymers also being referred to hereinafter as anionic and nonionic protective colloids respectively, and optionally one or more anionic or nonionic emulsifiers.

Examples of anionic protective colloids are alginates such as sodium alginate, copolymers of ethylenically unsaturated carboxylic acids, sulfonic acids or phosphonic acids with hydrophobic monomers, for example copolymers of acrylic acid or of methacrylic acid with hydrophobic monomers, copolymers of sulfoethyl acrylate, of sulfoethyl methacrylate, of sulfopropyl acrylate, of sulfopropyl methacrylate, of (sulfo-ethyl)maleimide, of 2-acrylamido-2-alkylsulfonic acids, of styrenesulfonic acid and/or of vinylsulfonic acid with at least one hydrophobic monomer, and copolymers of vinylphosphonic acid, of 2-acryloyloxyethyl phosphate, of 2-methacryloyloxyethyl phosphate, of 2-acryloyloxypropyl phosphate, of 2-methacryloyloxypropyl phosphate, of 2-acrylamido-2-methylpropyl phosphate and/or of 2-methacrylamido-2-methylpropyl phosphate with hydrophobic monomers. Examples of hydrophobic comonomers in this context are $C_1$-$C_{10}$-alkyl esters and $C_5$-$C_{10}$-cycloalkyl esters of ethylenically unsaturated monocarboxylic acids, for example the esters of acrylic acid and of methacrylic acid, vinylaromatic monomers such as styrene, α-methylstyrene, vinyltoluene and the like, and $C_2$-$C_{20}$-olefins. Examples of anionic protective colloids are also phenolsulfonic acid- and naphthalenesulfonic acid-formaldehyde condensates, and also phenolsulfonic acid- and naphthalenesulfonic acid-formaldehyde-urea condensates.

Examples of nonionic protective colloids are cellulose derivatives such as hydroxyethylcellulose, methylhydroxyethylcellulose, methylcellulose and methylhydroxypropylcellulose, polyvinylpyrrolidone, copolymers of vinylpyrrolidone with the aforementioned hydrophobic monomers, gelatin, gum arabic, xanthan, casein, poly(ethylene oxide-co-propylene oxide) block polymers, polyvinyl alcohol and partially hydrolyzed polyvinyl acetates.

In the process according to the invention, the at least one surface-active substance is generally used in an amount of 0.5 to 50% by weight, especially in an amount of 1 to 30% by weight, based on the total amounts of the monomers MM.

In another embodiment of the invention, the polymerization of the monomers MM is performed in the presence of at least one particulate material. The type of particulate material is generally of minor importance, and it may be inorganic or organic or a composite material.

The particulate material preferably has particle sizes less than 2 µm, especially if not more than 1 µm. In the case of agglomerates, the particle size is understood to mean the size of the primary particles (primary particle size) which form the agglomerate. The particulate inorganic material preferably has a mean particle size (weight-average particle diameter), and in the case of agglomerates a primary particle size (weight-average primary particle diameter), in the range from 1 to 2000 nm, frequently in the range from 2 to 1000 nm, preferably in the range from 2 to 500 nm and especially in the range from 2 to 200 nm. The mean particle diameters reported here are based on the mass averages or weight averages determined in a manner known per se by means of light scattering or an ultracentrifuge.

In a preferred embodiment of the invention, the particulate material is an inorganic material. Among these, preference is given in principle to inorganic materials which comprise metals or semimetals of the type defined above, especially oxides, nitrides or oxynitrides of the aforementioned metals or semimetals M, especially of silicon, aluminum, tin or boron. Among these, preference is given to the oxides, and particularly to the oxides of titanium, silicon, tin, aluminum and boron, and especially to silicon dioxide.

Examples of preferred inorganic particulate materials are titanium dioxide powder, especially pyrogenic titanium dioxide, aluminum oxide, especially pyrogenic aluminum oxide, and silica, especially high-dispersity silicas such as fumed silica or precipitated silica, in which the particles preferably have particle sizes or primary particle sizes within the ranges specified above. Such materials are commercially available, for example available on the market under the trade names Aerosil® and Aeroxide® (Evonik), Cab-O-Sil® and Spectral® (Cabot) or Syloid® (Grace). In a particularly preferred embodiment of the invention, the inorganic particulate material is a high-dispersity silica, especially a fumed silica.

In another preferred embodiment of the invention, the particulate material is an organic material. Examples of organic particulate materials are polymer particles as obtainable, for example, by suspension polymerization or dispersion polymerization in nonaqueous organic solvents (see, for example, K. E. J. Barret (ed.), "Dispersion Polymerization in Organic Media", Wiley 1974). Examples of suitable polymers are especially those which are formed from at least one of the aforementioned hydrophobic monomers, optionally one or more hydrophilic monomers, especially at least one ionic monomer which has a sulfonic acid group, a phosphonic acid group or a carboxyl group (e.g. acrylic acid, methacrylic acid, sulfoethyl acrylate, sulfoethyl methacrylate, sulfopropyl acrylate, sulfopropyl methacrylate, (sulfoethyl)maleimide, 2-acrylamido-2-alkylsulfonic acids, styrenesulfonic acid, vinylsulfonic acid, vinylphosphonic acid, 2-acryloyloxyethyl phosphate, 2-methacryloyloxyethyl phosphate, 2-acryloyloxypropyl phosphate, 2-methacryloyloxypropyl phosphate, 2-acrylamido-2-methylpropyl phosphate and/or 2-methacrylamido-2-methylpropyl phosphate) and optionally a crosslinker. Also suitable are the nonaqueous polymer dispersions described in EP 1403332 and U.S. Pat. No. 5,491,192.

In a further preferred embodiment of the invention, the particulate material is an organic/inorganic composite material, for example an inventive nanocomposite material.

In a preferred configuration of this embodiment, the particulate material comprises at least a portion of the polymerization initiator. This can be achieved, for example, by treating the particulate material with the polymerization initiator, for example by suspending the particulate material in a solution of the polymerization initiator, for example in a solution in the organic solvent used for polymerization. This can be achieved, for example, by using a particulate material which comprises a suitable initiator polymerized in a sufficient amount, for example monomers with a carboxyl, sulfonic acid or phosphonic acid group.

When the polymerization is performed in the presence of a particulate material, it is generally used in an amount of 0.01 to 100 parts by weight, especially in an amount of 0.05 to 50 parts by weight, based on 1 part by weight of the monomers MM (or in an amount of 1 to 10 000% by weight, especially in an amount of 5 to 5000% by weight, based on the total amount of the monomers MM, or in a ratio of particulate material to the total amount of the monomers MM in the range from 100:1 to 1:100, especially 50:1 to 1:20). In a preferred embodiment of the invention, the particulate material is used in an amount of 0.01 to 1 part by weight, especially in an amount of 0.055 to 0.5 part by weight, based on 1 part by weight of the monomers MM. In another preferred embodiment of the invention, the particulate material is used in an amount of 1 to 100 parts by weight, especially in an amount of 1.5 to 50 parts by weight, based on 1 part by weight of the monomers MM. While, in the former case, the properties of the particulate nanocomposite material thus obtainable are determined by the constituents formed in the course of polymerization, the particles obtainable in the course of polymerization in the second case have a core which consists of the particulate material used in the polymerization, and a shell which is arranged on the core and consists of the nanocomposite material obtained by polymerization of the monomers MM.

Of course, the particulate material can also be used in combination with the aforementioned surface-active compounds, for example in combination with one or more anionic and/or nonionic emulsifiers.

To perform the process according to the invention, the monomer(s) MM to be polymerized is/are contacted with the polymerization initiator in the organic solvent in the presence of the surface-active substance and/or in the presence of the particulate material.

When the polymerization is performed in the presence of the surface-active substance, it has been found to be useful in principle when at least a portion of the surface-active substance is already present in the polymerization vessel before the polymerization initiator is added, i.e. at least a portion or the entirety of the surface-active compound is added before the polymerization initiator. For example, the procedure may be that at least a portion or the entirety of the monomers MM to be polymerized and the surface-active substance are initially charged in the organic solvent used for polymerization, and the polymerization initiator is added thereto. The polymerization initiator can be added undiluted or diluted in the solvent used for polymerization. Subsequently, the remaining amount of the monomers MM which has not been initially charged and any remaining amounts of surface-active substance will then be added. When the polymerization is performed in the presence of a nonpolymerizable substance, preferably at least 50% by weight, especially at least 80% by weight or the entirety of surface-active compound will be initially charged. In the case of polymerizable emulsifiers, it has been found to be useful to add at least a portion of the polymerizable emulsifiers, for example at least 50% by weight, based on the entirety of polymerizable emulsifier, in the course of polymerization. Preference is given to initially charging at least 80% or the entirety of the monomers MM to be polymerized.

When the polymerization is performed in the presence of the particulate material, it has been found to be useful in principle when the monomers MM are added under polymerization conditions to a suspension of the particles in the organic solvent. "Under polymerization conditions" means that at least a portion of the polymerization initiator is already present in the reaction vessel before the majority of the monomers MM are added. The procedure for this purpose is preferably to initially charge a suspension of the particulate material in the organic solvent used for polymerization, to add at least a portion or the entirety of the polymerization initiator thereto and then to add the monomers to be polymerized.

According to the invention, the polymerization can also be performed in the absence of a surface-active substance with simultaneous absence of the particulate substance. In this case, the polymerization product, preferably in the form of the polymerization product suspended in the aprotic solvent, is treated with a solution of a base, preferably of an inorganic base, in a protic solvent or solvent mixture, preferably in an aqueous solvent, in the presence of at least one surface-active substance, preferably in the presence of at least one anionic surface-active substance.

The polymerization temperature is typically in the range from 0 to 150° C., especially in the range from 10 to 100° C.

Preference is given to performing the polymerization with intensive mixing of the polymerization mixture. The polymerization mixture can be mixed in a manner which is customary per se, for example by intensive stirring. In various cases, it has been found to be advantageous to promote the mixing by employing high shear forces, for example by employing mechanical homogenizers, by employing ultrasound, or by means of use of high-pressure homogenizers, jet nozzles or jet dispersers. Examples of mechanical homogenizers are rotor-stator systems such as Ultra-Turrax® (IKA), Dispax® reactor (homogenizers), toothed ring dispersers and mills, for example ball mills, toothed colloid mills (for example those from FrymaKoruma GmbH). Jet dispersers are known, for example, from EP 101007 and are supplied commercially by Lewa GmbH. Ultrasound homogenizers are likewise known to those skilled in the art and are supplied, for example, by Branson Ultrasonic Corp. NC, USA and Dr. Hielscher GmbH, Berlin.

The polymerization of the monomers MM may be followed by purification steps and optionally drying steps.

The polymerization of the monomers MM may be followed by a calcination. In this case, the organic polymeric material formed in the polymerization of the monomer unit(s) B is carbonized to the give the carbon phase.

When the polymerization is performed in the presence of at least one surface-active substance as defined above and/or of at least one particulate substance as defined above, polymer obtained in the polymerization is obtained in the form of a fine suspension of the particulate nanocomposite material in the solvent used for the polymerization (also referred to hereinafter as an organic suspension). The particulate nanocomposite material can be obtained from the organic suspension by removing the solvent, in the form of a pulverulent solid which is redispersible either in organic solvents or in water.

Alternatively, the organic suspension can be converted to an aqueous suspension by replacing the organic solvent with water. For example, water can be added to the suspension and the solvent used for polymerization can be removed, for example by phase separation or by a distillative route.

In a further embodiment of the invention, the nanocomposite material obtained in the polymerization is converted to a dispersion of the composite material in the aprotic solvent by a treatment with a solution of a base, preferably of an inorganic base, in a protic solvent or solvent mixture, preferably in an aqueous solvent, in the presence of at least one surface-active substance, preferably in the presence of at least one anionic surface-active substance. The particulate nanocomposite material can be isolated as a fine powder from this dispersion by removing the protic solvent.

Preferred protic solvents are, as well as water, alcohols having preferably 1 to 4 carbon atoms, e.g. methanol, ethanol, n-propanol, isopropanol, n-butanol, 2-butanol or tert-butanol, aliphatic polyols having 2 to 4 carbon atoms and 2 to 3 OH groups, such as glycerol, ethylene glycol or propylene glycol, (poly)etherols having 3 to 6 carbon atoms and 1 or 2 OH groups, e.g. 2-methoxyethanol, methoxypropanol, 2-ethoxyethanol, diethylene glycol, triethylene glycol, diethylene glycol methyl ether and the like, and mixtures of these solvents. The solvent is preferably an aqueous solvent, i.e. water or a mixture of water with a water-miscible solvent, especially with one of the aforementioned protic solvents, with water making up at least 50% by volume of the aqueous solvent. More particularly, water or a mixture of water with one of the aforementioned solvents is used, in which water makes up at least 90% by volume of the aqueous solvent mixture.

To convert the polymerization product to a dispersion of the particulate nanocomposite material in the protic, especially aqueous, solvent, the product of the polymerization of the monomers MM is contacted with a sufficient amount of protic, especially aqueous, solvent, of base and of surface-active substance. The procedure may be to contact the solid nanocomposite material which is obtained after removal of the aprotic solvent from the dispersion, obtained as a primary product, of the nanocomposite material obtained in the polymerization with a sufficient amount of protic, especially aqueous, solvent, of base and of surface-active substance. The procedure will preferably be to contact the dispersion, obtained as the primary product, of the nanocomposite material obtained in the polymerization in the aprotic solvent with a sufficient amount of protic, especially aqueous, solvent, of base and of surface-active substance, and optionally to partially or especially substantially or completely (i.e. to an extent of at least 95%) remove the aprotic solvent. The contacting is preferably effected with vigorous mixing.

The amount of protic solvent, especially of aqueous solvent, will generally be such that the resulting dispersion of the particulate nanocomposite material in the protic, especially aqueous, solvent comprises 1 to 55% by weight, particularly 5 to 50% by weight and especially 10 to 40% by weight, based on the total weight of the dispersion, of the particulate nanocomposite material.

Preferably, when converting the polymerization product to a dispersion of the particulate nanocomposite material in the protic, especially aqueous, solvent, the base used will be an inorganic base, for example an alkali metal hydroxide, alkaline earth metal hydroxide, alkali metal carbonate or alkaline earth metal oxide, preferably carbonate or hydroxide of lithium or sodium, particularly an alkali metal hydroxide or alkaline earth metal hydroxide and especially lithium hydroxide or sodium hydroxide. Suitable organic bases are, for example, tetra-$C_1$-$C_4$-alkylammonium hydroxides and hydroxy-$C_1$-$C_4$-alkyltri-$C_1$-$C_4$-alkylammonium hydroxides such as tetramethylammonium hydroxide and choline hydroxide.

Preference is given to using a 0.1 to 25% by weight, especially a 0.5 to 5% by weight, solution of the base in the aprotic, especially aqueous, solvent. Preference is given to using the base in such an amount as to result in an alkaline pH in the aqueous dispersion, especially in the range from 8 to 12.

In this embodiment of the invention, the polymerization product is converted to a dispersion of the particulate nanocomposite material in the protic, especially aqueous, solvent in the presence of at least one surface-active substance. This may be present in the polymerization product and/or in the aqueous solution of the base, or be supplied during the dispersion. In a preferred embodiment of the invention, the at least one surface-active substance is already present in the polymerization product, especially in the dispersion of the polymerization product in the aprotic solvent. The at least one surface-active substance can be added to the polymerization product before, during or after the polymerization. In a specific embodiment, the addition is effected toward the end or after the polymerization.

The surface-active substances used may in principle be the aforementioned surface-active substances, especially anionic surface-active substances and mixtures thereof with nonionic surface-active substances. Preference is given to the aforementioned anionic emulsifiers and mixtures thereof with nonionic emulsifiers.

Preferred anionic emulsifiers generally have, as well as at least one hydrophobic group, for example at least one aliphatic group or araliphatic group having at least 6 carbon atoms, as defined above, and at least one anionic group, for example 1 or 2 anionic groups, which are preferably selected from sulfonate groups and phosphonate groups, where the sulfonate groups and phosphonate groups may also be present as sulfate groups and phosphate groups respectively. Preferred inorganic anionic emulsifiers have 1 or 2 sulfonate or sulfate groups.

The preferred anionic emulsifiers include aliphatic, araliphatic and aromatic sulfonic acids having generally at least 6 carbon atoms and salts thereof, especially the ammonium and alkali metal salts thereof, sulfuric monoesters of ethoxylated alkanols and alkylphenols and salts thereof, especially the ammonium and alkali metal salts thereof, and also alkyl, aralkyl and aryl phosphates including phosphoric monoesters of alkanols and alkylphenols and salts thereof, especially the ammonium and alkali metal salts thereof.

Preferred anionic emulsifiers are:
 alkali metal and ammonium salts of dialkyl esters of sulfosuccinic acid (alkyl radical: $C_8$ to $C_{16}$),
 alkali metal and ammonium salts of alkyl sulfates (alkyl radical: $C_8$ to $C_{16}$),
 alkali metal and ammonium salts of sulfuric monoesters of ethoxylated alkanols (degree of ethoxylation: 4 to 30, alkyl radical: $C_8$ to $C_{18}$),
 alkali metal and ammonium salts of sulfuric monoesters of ethoxylated alkylphenols (EO: 3 to 50, alkyl radical: $C_4$ to $C_{16}$),
 alkali metal and ammonium salts of alkylsulfonic acids (alkyl radical: $C_{12}$ to $C_{18}$),
 alkali metal and ammonium salts of alkylarylsulfonic acids (alkyl radical: $C_9$ to $C_{18}$),
 compounds of the general formula

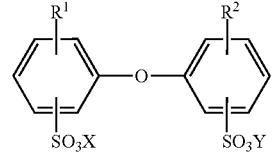

in which $R^1$ and $R^2$ are each hydrogen or $C_4$- to $C_{18}$-alkyl and are not both hydrogen, and X and Y may each be alkali metal ions and/or ammonium ions. $R^1$, $R^2$ are preferably each linear or branched alkyl radicals having 6 to 14 carbon atoms or hydrogen and especially having 6, 12 and 16 carbon atoms, where $R^1$ and $R^2$ are not both simultaneously hydrogen. X and Y are preferably sodium, potassium or ammonium ions, particular preference being given to sodium. Particularly advantageous compounds are those in which X and Y are each sodium, $R^1$ is a branched alkyl radical having 12 carbon atoms and $R^2$ is hydrogen or has one of the definitions specified for $R^1$ other than hydrogen. Frequently, technical grade mixtures which have a proportion of 50 to 90% by weight of the monoalkylated product are used, for example Dowfax®2A1 (trademark of Dow Chemical Company).

Among the aforementioned anionic emulsifiers, the following are particularly preferred:

alkali metal and ammonium salts of dialkyl esters of sulfosuccinic acid (alkyl radical: $C_8$ to $C_{16}$), and alkali metal and ammonium salts of alkyl sulfates or alkyl sulfonates (alkyl radical: $C_8$ to $C_{16}$), and mixtures thereof.

Suitable surface-active substances are also the aforementioned anionic or nonionic protective colloids, which can be used alone or in combination with the preferred anionic emulsifiers.

For conversion of the polymerization products to a dispersion of the nanocomposite material in the protic, especially aqueous, solvent, the procedure is preferably to treat a suspension of the nanocomposite material in the aprotic solvent with the protic solvent which comprises the base in dissolved form. The treatment is effected typically by mixing the aprotic solvent phase with the protic solvent, for example with vigorous stirring. The procedure may be to directly contact the solution of the base in the protic solvent with the dispersion of the nanocomposite material in the aprotic solvent, preferably by mixing. The procedure may also be first to contact the protic solvent with the dispersion of the nanocomposite material in the aprotic solvent, preferably by mixing, and then to add the base, preferably in the form of a solution in the protic solvent, and to continue the treatment.

When the polymerization product used was a suspension of the nanocomposite material in the aprotic solvent, the aprotic solvent is typically removed, for example by distillation or by phase separation, during or after the transfer of the composite material into the protic solvent.

The polymerization of the monomers MM may be followed by an oxidative removal of the organic polymer phase. In this case, the organic polymeric material formed in the polymerization of the monomer unit(s) B is oxidized and a nanoporous oxidic, oxynitridic or nitridic low-carbon or carbon-free material is obtained (<10% by weight, especially <5% by weight, of carbon, based on the total weight of the material).

The process according to the invention is especially suitable for twin polymerization of those monomers MM in which the monomer unit A comprises a metal or semimetal which is selected from the metals and semimetals of main group 3 (IUPAC group 3), especially B or Al, metals and semimetals of main group 4 of the periodic table (IUPAC group 14), especially Si, Ge, Sn or Pb, semimetals of main group 5 of the periodic table (IUPAC group 15), especially As, Sb and Bi, metals of transition group 4 of the periodic table, especially Ti, Zr and Hf, and metals of transition group 5 of the periodic table, for example vanadium. The process according to the invention is suitable especially for twin polymerization of those monomers in which the monomer unit A comprises a metal or semimetal which is selected from the metals and semimetals of main group 4 of the periodic table, especially Si, Ge, Sn or Pb, and metals of transition group 4 of the periodic table, especially Ti, Zr and Hf. The process according to the invention is more preferably suitable for twin polymerization of those monomers in which the monomer unit A comprises a metal or semimetal selected from Si and Ti. The process according to the invention is most preferably suitable for twin polymerization of those monomers in which, at least in a portion or the entirety of the monomers, the monomer unit A comprises essentially exclusively silicon. In a very particularly preferred embodiment, at least 90 mol % and especially the entirety of the metals or semimetals present in the twin monomers are silicon. In a likewise very particularly preferred embodiment, at least 90 mol % and especially the entirety of the metals or semimetals present in the twin monomers is boron. In a likewise particularly preferred embodiment, at least 90 mol % and especially the entirety of the metals or semimetals present in the twin monomers are selected from combinations of silicon with at least one further metal atom, particularly titanium or tin, especially titanium. In this case, the molar ratio of silicon to the further metal atom is preferably in the range from 10:1 to 1:10 and especially in the range from 1:5 to 5:1.

Compounds suitable as twin monomers MM are known from the prior art or can be prepared in an analogous manner to the methods described therein. Reference may be made here, for example, to the literature cited at the outset and to:

silyl enol ethers (Chem. Ber. 119, 3394 (1986); J. Organomet. Chem. 244, 381 (1981); JACS 112, 6965 (1990))

cycloboroxanes (Bull. Chem. Soc. Jap. 51, 524 (1978); Can. J. Chem. 67, 1384 (1989); J. Organomet. Chem. 590, 52 (1999))

cyclosilicates and -germanates (Chemistry of Heterocyclic Compounds, 42, 1518, (2006); Eur. J. Inorg. Chem. (2002), 1025; J. Organomet. Chem. 1, 93 (1963); J. Organomet. Chem. 212, 301 (1981); J. Org. Chem. 34, 2496 (1968); Tetrahedron 57, 3997 (2001) and prior international applications WO 2009/083082 and WO2009/083083)

cyclostannanes (J. Organomet. Chem. 1, 328 (1963))

cyclozirconates (JACS 82, 3495 (1960)).

Suitable monomers MM can be described by the general formula I:

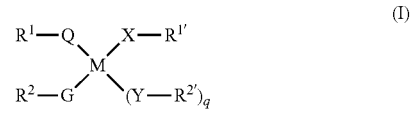

in which

M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably B, Si, Ti, Zr or Sn, even more preferably B, Si or Ti and especially Si;

$R^1$, $R^2$ may be the same or different and are each an Ar—C($R^a$, $R^b$)— radical in which Ar is an aromatic or heteroaromatic ring which optionally has 1 or 2 substituents selected from halogen, CN, $C_1$-$C_6$-alkoxy and phenyl, and $R^a$, $R^b$ are each independently hydrogen or methyl or together are an oxygen atom or a methylidene group (=$CH_2$) and in particular are both hydrogen, or the R¹Q and R²G radicals together are a radical of the formula A

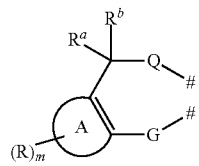

in which A is an aromatic or heteroaromatic ring fused to the double bond, m is 0, 1 or 2, the R radicals may be the same or different and are each selected from halogen, CN, $C_1$-$C_6$-alkyl, $C_1$-$C_6$-alkoxy and phenyl, and $R^a$, $R^b$ are each as defined above;

G is O, S or NH and especially O;
Q is O, S or NH and especially O;
q according to the valency or charge of M is 0, 1 or 2 and especially 1,
X, Y may be the same or different and are each O, S, NH or a chemical bond and especially oxygen or a chemical bond;
$R^{1'}$, $R^{2'}$ may be the same or different and are each $C_1$-$C_6$-alkyl, $C_3$-$C_6$-cycloalkyl, aryl or an Ar'—C($R^{a'}$, $R^{b'}$)- radical in which Ar' is as defined for Ar and $R^{a'}$, $R^{2'}$ are each as defined for $R^a$, $R^b$ and in particular are hydrogen, or $R^{1'}$, $R^{2'}$ together with X and Y are a radical of the formula A, as defined above.

Also suitable for the twin copolymerization are monomers of the formula I in which M, R¹, R², G, Q, q, Y and $R^{2'}$ are each as defined above, in which the $R^{1'}$ radical is a radical of the formula:

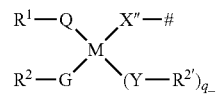

in which q, R¹, R², $R^{2'}$, Y, Q and G are each as defined above, X" is as defined for Q and is especially oxygen, and # means the bond to M. Among these, preference is given to those monomers in which M, R¹, R², G, Q, q, Y and $R^{2'}$ have the definitions specified as preferred, especially those in which the R¹Q and R²G radicals together are a radical of the formula A.

Also suitable for the twin copolymerization are monomers which derive from the monomers of the formula I in which M is Ti or Zr, q=1 and Q and G are each oxygen, specifically such that these monomers are µ-oxido-bridged oligomers, e.g. tetramers.

In the monomers of the formula I, the molecular moieties corresponding to the R¹ and R²G radicals constitute polymerizable B unit(s). When X and Y are not a chemical bond and R¹'X and R²'Y are not inert radicals such as $C_1$-$C_6$-alkyl, $C_3$-$C_6$-cycloalkyl or aryl, the R¹'X and R²'Y radicals likewise constitute polymerizable B unit(s). In contrast, the metal atom M, optionally together with the Q and Y groups, forms the main constituent of the monomer unit A.

In the context of the invention, an aromatic radical or aryl is understood to mean a carbocyclic aromatic hydrocarbon radical such as phenyl or naphthyl.

In the context of the invention, a heteroaromatic radical or hetaryl is understood to mean a heterocyclic aromatic radical which generally has 5 or 6 ring members, where one of the ring members is a heteroatom selected from nitrogen, oxygen and sulfur, and 1 or 2 further ring members may optionally be a nitrogen atom and the remaining ring members are carbon. Examples of heteroaromatic radicals are furyl, thienyl, pyrrolyl, pyrazolyl, imidazolyl, oxazolyl, isoxazolyl, pyridyl, pyrimidyl, pyridazinyl or thiazolyl.

In the context of the invention, a fused aromatic radical or ring is understood to mean a carbocyclic aromatic divalent hydrocarbon radical such as o-phenylene (benzo) or 1,2-naphthylene (naphtho).

In the context of the invention, a fused heteroaromatic radical or ring is understood to mean a heterocyclic aromatic radical as defined above, in which two adjacent carbon atoms form the double bond shown in formula A or in the formulae II and III.

In a first embodiment of the monomers of the formula I, the R¹Q and R²G groups together are a radical of the formula A as defined above, especially a radical of the formula Aa:

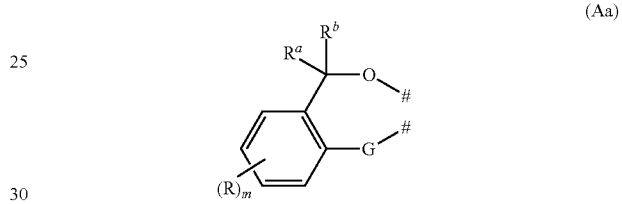

in which #, m, R, $R^a$ and $R^b$ are each as defined above. In the formulae A and Aa, the variable m is especially 0. When m is 1 or 2, R is especially a methyl or methoxy group. In the formulae A and Aa, $R^a$ and $R^b$ are especially each hydrogen. In formula A, Q is especially oxygen. In the formulae A and Aa, G is especially oxygen or NH, especially oxygen.

Among the monomers of the first embodiment, preference is given especially to those monomers of the formula I in which q=1 and in which the X—$R^{1'}$ and Y—$R^{2'}$ groups together are a radical of the formula A, especially a radical of the formula Aa. Such monomers can be described by the following formulae II and IIa:

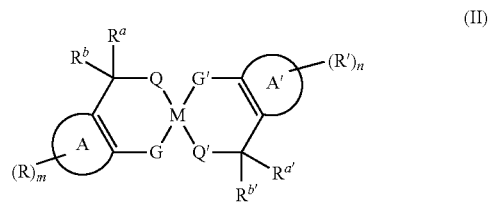

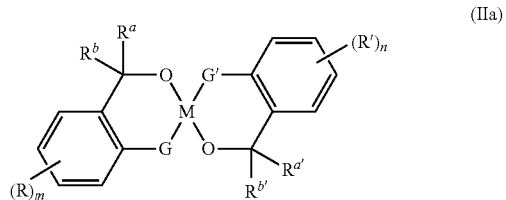

Among the twin monomers of the first embodiment, preference is further given to those monomers of the formula I in which q is 0 or 1 and in which the X—R¹ group is a radical of the formula A' or Aa':

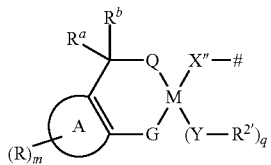

(A')

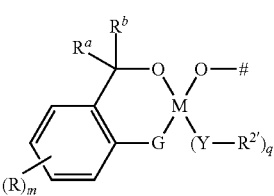

(A')

in which m, A, R, $R^a$, $R^b$, G, Q, X", Y, $R^{2'}$ and q are each as defined above, and especially have the definitions specified as preferred.

Such monomers can be described by the following formulae II' or IIa':

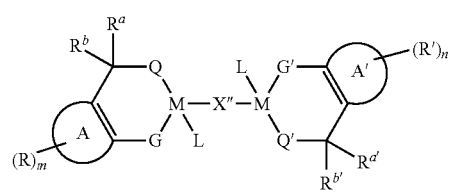

(II')

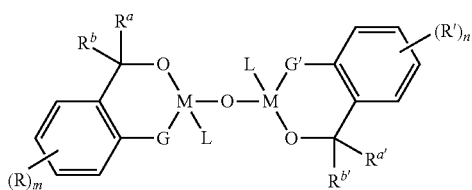

(IIa')

In the formulae II and II', the variables are each defined as follows:

M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably B, Si, Ti, Zr or Sn, especially Si;

A, A' are each independently an aromatic or heteroaromatic ring fused to the double bond;

m, n are each independently 0, 1 or 2, especially 0;

G, G' are each independently O, S or NH, in particular O or NH and especially O;

Q, Q' are each independently O, S or NH, in particular O;

R, R' are each independently selected from halogen, CN, $C_1$-$C_6$-alkyl, $C_1$-$C_6$-alkoxy and phenyl, and are especially each independently methyl or methoxy;

$R^a$, $R^b$, $R^{a'}$, $R^{b'}$ are each independently selected from hydrogen and methyl, or $R^a$ and $R^b$ and/or $R^{a'}$ and $R^{b'}$ in each case together are an oxygen atom or =$CH_2$; in particular, $R^a$, $R^b$, $R^{a'}$, $R^{b'}$ are each hydrogen;

L is a $(Y-R^{2'})_q$ group in which Y, $R^{2'}$ and q are each as defined above and X" has one of the definitions specified for Q and is especially oxygen.

In the formulae IIa and IIa', the variables are each defined as follows:

M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably Si, Ti, Zr or Sn, especially Si;

m, n are each independently 0, 1 or 2, especially 0;

G, G' are each independently O, S or NH, in particular O or NH and especially O;

R, R' are each independently selected from halogen, CN, $C_1$-$C_6$-alkoxy and phenyl, and are especially methyl or methoxy;

$R^a$, $R^b$, $R^{a'}$, $R^{b'}$ are each independently selected from hydrogen and methyl, or $R^a$ and $R^b$ and/or $R^{a'}$ and $R^{b'}$ in each case together are an oxygen atom; in particular, $R^a$, $R^b$, $R^{a'}$, $R^{b'}$ are each hydrogen;

L is a $(Y-R^{2'})_q$ group in which Y, $R^{2'}$ and q are each as defined above.

One example of a monomer of the formula II or IIa is 2,2'-spirobis[4H-1,3,2-benzodioxasilin] (compound of the formula IIa where M=Si, m=n=0, G=O, $R^a$=$R^b$=$R^{a'}$=$R^{b'}$=hydrogen). Such monomers are known from prior international patent applications WO 2009/083082 and PCT/EP 2008/010169 [WO 2009/083083] or can be prepared by the methods described there. A further example of a monomer IIa is 2,2-spirobi[4H-1,3,2-benzodioxaborin] (Bull. Chem. Soc. Jap. 51 (1978) 524): (compound of the formula IIa where M=B, m=n=0, G=O, $R^a$=$R^b$=$R^{a'}$=$R^{b'}$=hydrogen). A further example of a monomer IIa' is bis(4H-1,3,2-benzodioxaborin-2-yl)oxide (compound of the formula IIa' where M=B, m=n=0, L absent (q=0), G=O, $R^a$=$R^b$=$R^{a'}$=$R^{b'}$=hydrogen; Bull. Chem. Soc. Jap. 51 (1978) 524).

In the monomers II and IIa, the MQQ' or $MO_2$ unit constitutes the polymerizable A unit, whereas the remaining parts of the monomer II or IIa, i.e. the groups of the formula A or Aa, minus the Q or Q' atoms (or minus the oxygen atom in Aa) constitute the polymerizable B units.

The monomers MM in principle also include the monomers of the formulae III and IIIa defined below.

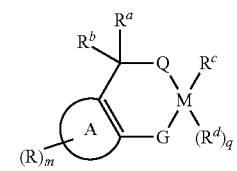

(III)

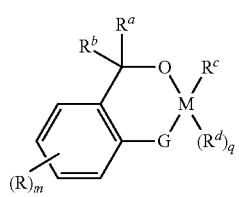

(IIIa)

In formula III, the variables are each defined as follows:

M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably B, Si, Ti, Zr or Sn, especially Si;

A is an aromatic or heteroaromatic ring fused to the double bond;

m is 0, 1 or 2, especially 0;

G is O, S or NH, in particular O or NH and especially O;

Q is O, S or NH, in particular O;

q according to the valency or charge of M is 0, 1 or 2;

R is independently selected from halogen, CN, $C_1$-$C_6$-alkyl, $C_1$-$C_6$-alkoxy and phenyl, and is especially methyl or methoxy;

$R^a$, $R^b$ are each independently selected from hydrogen and methyl, or $R^a$ and $R^b$ may together be an oxygen atom or =$CH_2$, and are especially both hydrogen;

$R^c$, $R^d$ are the same or different and are each selected from $C_1$-$C_6$-alkyl, $C_3$-$C_6$-cycloalkyl and aryl, and are especially each methyl.

In formula IIIa, the variables are each defined as follows:

M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably B, Si, Ti, Zr or Sn, especially Si;

m is 0, 1 or 2, especially 0;

G is O, S or NH, in particular O or NH and especially O;

R radicals are independently selected from halogen, CN, $C_1$-$C_6$ alkyl, $C_1$-$C_6$-alkoxy and phenyl, and are especially methyl or methoxy;

$R^a$, $R^b$ are each independently selected from hydrogen and methyl, or $R^a$ and $R^b$ may together be an oxygen atom or =$CH_2$, and are especially both hydrogen;

$R^c$, $R^d$ are the same or different and are each selected from $C_1$-$C_6$-alkyl, $C_3$-$C_6$-cycloalkyl and aryl, and are especially each methyl.

Examples of monomers of the formula III or IIIa are 2,2-dimethyl-4H-1,3,2-benzodioxasilin (compound of the formula IIIa where M=Si, q=1, m=0, G=O, $R^a$=$R^b$=hydrogen, $R^c$=$R^d$=methyl), 2,2-dimethyl-4H-1,3,2-benzoxazasilin (compound of the formula III a where M=Si, q=1, m=0, G=NH, $R^a$=$R^b$=hydrogen, $R^c$=$R^d$=methyl), 2,2-dimethyl-4-oxo-1,3,2-benzodioxasilin (compound of the formula IIIa where M=Si, q=1, m=0, G=O, $R^a$+$R^b$=O, $R^c$=$R^d$=methyl) and 2,2-dimethyl-4-oxo-1,3,2-benzoxazasilin (compound of the formula IIIa where M=Si, q=1, m=0, G=NH, $R^a$+$R^b$=O, $R^e$=$R^d$=methyl). Such monomers are known, for example, from Wieber et al. Journal of Organometallic Chemistry; 1, 1963, 93, 94. Further examples of monomers IIIa are 2,2-diphenyl[4H-1,3,2-benzodioxasilin](J. Organomet. Chem. 71 (1974) 225); 2,2-di-n-butyl[4H-1,3,2-benzodioxastannin] (Bull. Soc. Chim. Belg. 97 (1988) 873); 2,2-dimethyl[4-methylidene-1,3,2-benzodioxasilin] (J. Organomet. Chem., 244, C5-C8 (1983)); 2-methyl-2-vinyl[4-oxo-1,3,2-benzodioxazasilin].

The monomers of the formula III or IIIa are preferably not copolymerized alone but in combination with the monomers of the formulae II and IIa.

In a further preferred embodiment, the monomers of the formula I are those described by the formula IV, V, Va, VI or VIa.

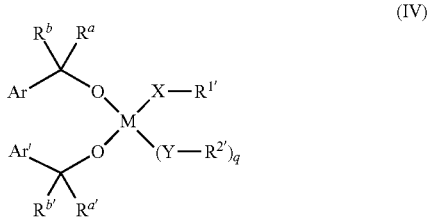

(IV)

In formula IV, the variables are each defined as follows:

M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably B, Si, Ti, Zr or Sn, especially Si;

Ar, Ar' are the same or different and are each an aromatic or heteroaromatic ring, especially 2-furyl or phenyl, where the aromatic or heteroaromatic ring optionally has 1 or 2 substituents selected from halogen, CN, $C_1$-$C_6$-alkyl, $C_1$-$C_6$-alkoxy and phenyl;

$R^a$, $R^b$, $R^{a'}$, $R^{b'}$ are each independently selected from hydrogen and methyl, or $R^a$ and $R^b$ and/or $R^{a'}$ and $R^{b'}$ in each case together are an oxygen atom; $R^a$, $R^b$, $R^{a'}$, $R^{b'}$ are especially each hydrogen;

q according to the valency of M is 0, 1 or 2 and especially 1;

X, Y are the same or different and are each O, S, NH or a chemical bond; and $R^{1'}$, $R^{2'}$ are the same or different and are each $C_1$-$C_6$-alkyl, $C_3$-$C_6$-cycloalkyl, aryl or an Ar"—C($R^{a''}$,$R^{b''}$)- radical in which Ar" is as defined for Ar and R', and $R^{a''}$, $R^{b''}$ are each as defined for $R^a$, $R^b$ or for $R^{a'}$, $R^{b'}$, or $R^{1'}$, $R^{2'}$ together with X and Y are a radical of the formula A, especially a radical of the formula Aa, as defined above.

Among the monomers of the formula IV, preference is given especially to those monomers in which q=0, 1 or 2, especially q=1, and the X—$R^{1'}$ and Y—$R^{2'}$ groups are the same or different and are each an Ar"—C($R^{a''}$,$R^{b''}$)O group, and are preferably each an Ar"—$CH_2$O group ($R^a$=$R^b$=hydrogen), where Ar" is as defined above and is especially selected from furyl, thienyl, pyrrolyl and phenyl, where the four rings mentioned are unsubstituted or have one or two substituents selected from halogen, CN, $C_1$-$C_6$-alkyl, $C_1$-$C_6$-alkoxy and phenyl. Such monomers can be described by the following formulae V and Va:

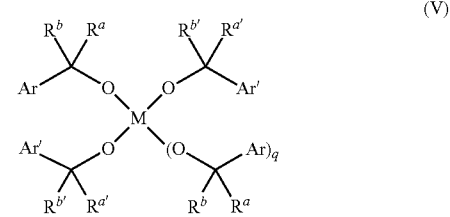

(V)

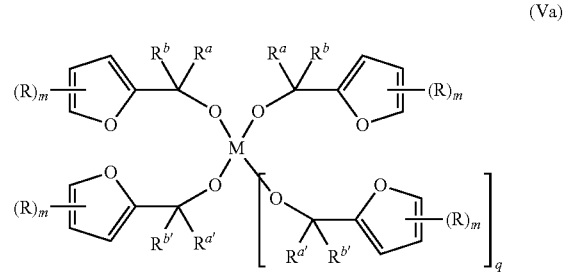

(Va)

In the formulae V and Va, the variables are each defined as follows:

M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably B, Si, Ti, Zr or Sn, especially Si;

Ar, Ar' in formula V are the same or different and are each an aromatic or heteroaromatic ring, especially 2-furyl or phenyl, where the aromatic or heteroaromatic ring optionally has 1 or 2 substituents selected from halogen, CN, $C_1$-$C_6$-alkyl, $C_1$-$C_6$-alkoxy and phenyl;

$R^a$, $R^b$, $R^{a'}$, $R^{b'}$ are each independently selected from hydrogen and methyl, or $R^a$ and $R^b$ and/or $R^{a'}$ and $R^{b'}$ in each case together are an oxygen atom; $R^a$, $R^b$, $R^{a'}$, $R^{b'}$ are especially each hydrogen;

q according to the valency of M is 0, 1 or 2 and especially 1.

In formula Va, m is 0, 1 or 2 and especially 0, and R is selected from halogen, CN, $C_1$-$C_6$-alkyl, $C_1$-$C_6$-alkoxy and phenyl, and especially from methyl and methoxy.

One example of a monomer of the formula V or Va is tetrafurfuryloxysilane (compound of the formula Va where M=Si, q=1, m=0, $R^a$=$R^b$=hydrogen): Angew. Chem. Int. Ed., 46 (2007) 628. A further example of the monomer V or Va is tetrafurfuryl orthotitanate: Adv. Mater. 2008, 20, 4113. This compound tetramerizes to ($\mu^4$-oxido)-hexakis(m-furfuryloxo)-octakis(furfuryloxo)tetratitanium, which is used as a twin monomer. A further example of the monomer V or Va is trifurfuryloxyborane (compound of the formula Va where M=B, q=0, m=0, $R^a$=$R^b$=hydrogen).

The monomers of the formula IV also include those monomers in which the X—$R^{1'}$ and Y—$R^{2'}$ groups are the same or different and are each selected from $C_1$-$C_4$-alkyl, especially methyl, $C_3$-$C_6$-cycloalkyl and aryl, for example phenyl, i.e. X and Y are each a chemical bond. Such monomers can be described by the following formulae VI and Va:

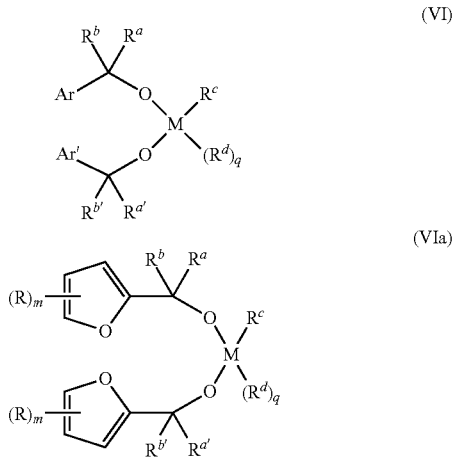

In the formulae VI and VIa, the variables are each defined as follows:

M is a metal or semimetal, preferably a metal or semimetal of main group 3 or 4 or of transition group 4 or 5 of the periodic table, especially B, Al, Si, Ti, Zr, Hf, Ge, Sn, Pb, V, As, Sb or Bi, more preferably B, Si, Ti, Zr or Sn, especially Si;

Ar, Ar' in formula VI are the same or different and are each an aromatic or heteroaromatic ring, especially 2-furyl or phenyl, where the aromatic or heteroaromatic ring optionally has 1 or 2 substituents selected from halogen, CN, $C_1$-$C_6$-alkyl, $C_1$-$C_6$-alkoxy and phenyl;

$R^a$, $R^b$, $R^{a'}$, $R^{b'}$ are each independently selected from hydrogen and methyl, or $R^a$ and $R^b$ and/or $R^{a'}$ and $R^{b'}$ in each case together are an oxygen atom; $R^a$, $R^b$, $R^{a'}$, $R^{b'}$ are especially each hydrogen;

q according to the valency of M is 0, 1 or 2 and especially 1;

$R^c$, $R^d$ are the same or different and are each selected from $C_1$-$C_6$-alkyl, $C_3$-$C_6$-cycloalkyl and aryl, and are especially each methyl.

In formula VIa, m is 0, 1 or 2 and is especially 0, and R is selected from halogen, CN, $C_1$-$C_6$-alkyl, $C_1$-$C_6$-alkoxy and phenyl and especially from methyl and methoxy.

One example of a monomer of the formula VI or VIa is bis(furfuryloxy)dimethylsilane (compound of the formula VIa where M=Si, q=1, m=0, $R^a$=$R^b$=hydrogen, $R^c$=$R^d$=methyl).

Such monomers of the formulae IV, V, Va, VI and VIa are known from the prior art, for example from the article by Spange et al. cited at the outset and the literature cited therein, or can be prepared in an analogous manner.

The monomers of the formulae VI and/or VIa are preferably not polymerized alone but in combination with the monomers of the formulae V and/or Va.

In a further embodiment of the invention, the twin monomers MM are selected from aromatic compounds which have an average of at least two trialkylsilyloxymethyl groups and/or aryldialkylsilyloxymethyl groups bonded to identical or different aryl groups, especially to benzene rings. Alkyl in this context is alkyl having 1 to 4 carbon atoms, especially methyl or ethyl. Aryl in this context is phenyl or naphthyl, especially phenyl. One example of a trialkylsilyloxymethyl group is trimethylsilyloxymethyl (($H_3C)_3$Si—O—$CH_2$—). One example of an aryldialkylsilyloxymethyl group is dimethyl-phenylsilyloxymethyl (phenyl($H_3C)_2$Si—O—$CH_2$—). In this case, the aryl ring to which the trialkylsilyloxymethyl groups and/or aryldialkylsilyloxymethyl groups are bonded may have further substituents, for example $C_1$-$C_4$-alkoxy such as methoxy, $C_1$-$C_4$-alkyl, trialkylsilyloxy or aryldialkylsilyloxy. More particularly, such twin monomers are phenolic compounds which have at least two trialkylsilyloxymethyl groups and/or aryldialkylsilyloxymethyl groups bonded to phenyl rings of the phenolic compound, where the OH groups of the phenolic compounds may be etherified, especially with trialkylsilyl groups and/or aryldialkylsilyl groups. Such compounds can be prepared by hydroxymethylation of aromatic compounds, especially of phenolic compounds, and subsequent reaction with trialkylhalosilanes or with aryldialkylhalosilanes, and in the case of phenolic starting materials not only the hydroxymethyl groups but also the phenolic OH groups are converted to the corresponding silyl ethers. Examples of aromatic compounds are especially phenolic compounds such as phenol, cresols and bisphenol A (=2,2-bis(4-hydroxyphenyl)propane).

The aforementioned aromatic compounds which have an average of at least two trialkylsilyloxymethyl groups and/or aryldialkylsilyloxymethyl groups bonded to identical or different aryl groups, especially to phenyl rings, can be homopolymerized or copolymerized as such. Preference is given to copolymerizing the aromatic compounds which have an average of at least two trialkylsilyloxymethyl groups and/or aryldialkylsilyloxymethyl groups bonded to identical or different aryl groups, especially to phenyl rings, together with the monomers of the formula II, IIa, II' or II' a or with the compounds of the formulae IV or V or Va.

The invention also relates to a nanocomposite material obtainable by this process.

The invention relates especially to a particulate nanocomposite material, in which the particles of the nanocomposite material comprise a) at least one inorganic or organo(semi)metallic phase A which comprises at least one (semi)metal M; and b) at least one organic polymer phase P, in which the organic polymer phase P and the inorganic or organometallic phase A form essentially co-continuous phase domains, the mean distance between two adjacent domains of identical phases being not more than 100 nm, frequently 40 nm, particularly 10 nm and especially not more than 5 nm, and in which the particle sizes of the particles of the nanocomposite material ($d_{90}$ and $d_{50}$ values of the mass distribution) have the values specified above.

The nanocomposite material obtainable by the process according to the invention is particulate, i.e. the polymer is present in the form of discrete particles with dimensions in the micrometer or even nanometer range. It typically has mean particle sizes below 5 µm, frequently of not more than 2 µm, particularly not more than 1000 nm and especially not more than 500 nm. The mean particle sizes are understood here and hereinafter to mean the weight-average particle diameter ($d_{50}$ value of the mass distribution of the particle diameters). Preferably, at least 90% by weight of the particles of the nanocomposite material obtainable in accordance with the invention have particle diameters of less than 8 µm, frequently of not more than 3 µm or less, particularly of not more than 1500 nm or less and especially of not more than 700 nm or less (known as the $d_{90}$ value of the mass distribution of the particle diameters: particle diameter which exceeds 90% of the particles). The particles of the nanocomposite materials obtainable in accordance with the invention are preferably characterized by a particle size distribution (mass distribution of the particle diameters) whose $d_{50}$ value is in the range from 2 to 5000 nm, frequently in the range from 5 to 2000 nm, particularly in the range from 8 to 1000 nm and especially in the range from 10 to 500 nm. Preferably, the particles of the nanocomposite materials obtainable in accordance with the invention are characterized by a particle size distribution (mass distribution of the particle diameters) whose $d_{90}$ value is in the range from 5 to 8000 nm, frequently in the range from 10 to 3000 nm, particularly in the range from 15 to 1500 nm and especially in the range from 20 to 700 nm.

The particle sizes and particle size distributions specified here are based on the particle diameters at 23° C. which are determined by ultracentrifugation and discriminated according to proportions by mass. The determination is effected typically by means of an ultracentrifuge by standard methods, for example by the methods described by H. Cölfen, "Analytical Ultracentrifugation of Nanoparticles" in Encyclopedia of Nanoscience and Nanotechnology, (American Scientific Publishers, 2004), p. 67-88 or W. Mächtle and L. Börger in "Analytical Ultracentrifugation of Polymers and Nanoparticles", (Springer, Berlin, 2006).

The particles of the inventive nanocomposite material consist generally of the material formed in the course of polymerization, consisting of the phases A and P, of the optionally used particulate material and optionally of a portion or of the entirety of surface-active substance used, especially when it is a polymerizable emulsifier. In a preferred embodiment of the invention, the entirety of the phases A and P, based on the entirety of the particulate material, makes up at least 50% by weight, especially at least 70% by weight. In another embodiment of the invention, the entirety of the phases A and P, based on the total amount of the particulate material, makes up 1 to 50% by weight, particularly 2 to 35% by weight.

The particles of the inventive nanocomposite material may have a regular or irregular form. The particles may have a symmetrical form, for example spherical form or the form of ellipsoids. However, they may also have irregular forms, for example forms composed of a plurality of interpenetrating spheres or ellipsoids, including a raspberry morphology. The particles may also have a core-shell structure, in which case the shell is generally formed by a polymer consisting of the phases A and P, but the core need not necessarily be a material which consists of the phases A and P, but may also be a material which corresponds to the particulate material optionally used in the polymerization.

In the particles of the particulate nanocomposite material obtainable in accordance with the invention, the inorganic or organo(semi)metallic phase formed by polymerization of the monomer unit A and the organic polymer phase formed by polymerization of the monomer unit B are present in exceptionally fine distribution. The dimensions of the phase domains in the composite material thus obtained are in the region of a few nanometers. In addition, the phase domains of the inorganic or organo(semi)metallic phase A and the phase domains of the organic polymer phase B in the particles have a co-continuous arrangement, i.e. both the organic phase and the inorganic or organo(semi)metallic phase penetrate one another and essentially do not form any discontinuous regions. The distances between adjacent phase interfaces or the distances between the domains of adjacent identical phases are extremely small and generally will not exceed a mean value of 100 nm, frequently 40 nm, particularly 10 nm and especially not more than 5 nm. There is no macroscopically visible separation in discontinuous domains of the particular phase.

The distance between adjacent identical phases is understood to mean, for example, the distance between two domains of the inorganic or organo(semi)metallic phase which are separated from one another by a domain of the organic polymer phase, or the distance between two domains of the organic polymer phase which are separated from one another by a domain of the inorganic or organo(semi)metallic phase. The mean distance between the domains of adjacent identical phases can be determined by means of combined small-angle X-ray scattering (SAXS) via the scattering vector q (measurement in transmission at 20° C., monochromatized $CuK_\alpha$ radiation, 2D detector (image plate), slit collimation).

With regard to the terms "continuous phase domains", "discontinuous phase domains" and "co-continuous phase domains", reference is also made to W. J. Work et al. Definitions of Terms Related to Polymer Blends, Composites and Multiphase Polymeric Materials, (IUPAC Recommendations 2004), Pure Appl. Chem., 76 (2004), p. 1985-2007, especially p. 2003. According to this, a co-continuous arrangement of a two-component mixture is understood to mean a phase-separated arrangement of the two phases, in which within one domain of each phase all the regions of the phase domain boundary can be connected to one another by a continuous path, without the path crossing any phase boundary.

In the inventive nanocomposite materials, the regions in which the organic phase and the inorganic or organo(semi)metallic phase form essentially co-continuous phase domains make up at least 80% by volume, especially 90% by volume, of the nanocomposite materials, as can be determined by combined use of TEM and SAXS.

The type of the organic polymer phase P in the inventive materials is naturally predetermined by the type of monomer unit. In a preferred embodiment, the organic polymer P formally comprises condensation products of aromatics such as furan, thiophene, pyrrole, and aldehydes condensable therewith, such as formaldehyde, especially a furan-formaldehyde condensation product, pyrrole-formaldehyde condensation product, thiophene-formaldehyde condensation product or a phenol condensation product, where the aromatics, especially the furan, pyrrole, thiophene or phenol units, in the condensation product are optionally substituted in the manner described hereinafter.

The inorganic phase or organo(semi)metallic phase a) in the inventive nanocomposite materials (hereinafter, phase a)) comprises the metal or semimetal M of the polymerizable unit A. The metal M of the monomer unit obtainable in accordance with the invention in the monomers MM and hence also in the phase a) is preferably selected from B, Al, Si, Ti, Zr, Hf, Ge, Sn, Pb, V, As, Sb, Bi and mixtures thereof. M is particularly selected from B, Al, Si, Ti and Sn, especially from B, Al and S. Particularly at least 90 mol %, especially at least 99 mol % or the entirety of all (semi)metal atoms M in the monomers MM, and hence also in the phase a), are silicon atoms.

The phase a) of the nanocomposite material obtainable in accordance with the invention may be an inorganic or an organometallic or organosemimetallic phase. The phase a) may, for example, be an oxidic, sulfidic or nitridic phase, or a mixed form of the aforementioned phases or mixtures of the aforementioned phases, preference being given to oxidic and nitridic phases, mixed forms thereof (oxynitrides), or mixtures of oxides and nitrides. In the phase a), the metal atoms, as well as oxygen, nitrogen and/or sulfur, may also have organic radicals bonded directly to the metal atom. In this case, the phase a) is an organometallic or organosemimetallic phase. In a particularly preferred embodiment, the phase a) is an oxidic phase, for example a silicon dioxide, titanium dioxide, aluminum oxide or boron oxide phase. More particularly, the phase a) is silicon dioxide.

The inventive particulate nanocomposite materials can be converted in a manner known per se to nanoporous particulate inorganic materials which are low in carbon and are especially substantially carbon-free, by oxidatively removing the organic constituents of the inventive nanocomposite material. In this process, both the particle sizes and the nanostructure of the inorganic phase present in the inventive nanocomposite material are maintained, and the result, depending on the selected monomers, is a particulate nitride, oxynitride or oxide of the (semi)metal M or a mixed form which has a nanoporous structure within the particles owing to the organic constituents removed. The oxidation is effected typically by calcination in an oxygenous atmosphere as described in the article by Spange et al. cited at the outset. Such materials are novel and likewise form part of the subject matter of the present invention. The particle sizes are within the ranges specified above for the nanocomposite material. The carbon content in such materials is generally <10% by weight, particularly <5% by weight, and especially <1% by weight of carbon, based on the total weight of the material. In general, the calcination is performed with ingress of oxygen at a temperature in the range from 400 to 1500° C., especially in the range from 500 to 1000° C. The calcination is effected typically in an oxygenous atmosphere, for example in air or other oxygen/nitrogen mixtures, where the proportion by volume of oxygen can be varied over wide ranges and is, for example, in the range from 5 to 50% by volume.

The inventive particulate nanocomposite materials can also be converted to a particulate electroactive nanocomposite material which, as well as an inorganic phase of a (semi)metal oxide, oxynitride or nitride of the (semi)metal M, has a carbon phase C. Such materials are obtainable by calcining or carbonizing the nanocomposite material obtainable in accordance with the invention with substantial or complete exclusion of oxygen. Accordingly, the present invention relates to a carbon-containing nanocomposite material which comprises
a) a carbon phase C;
b) and at least one inorganic phase of a (semi)metal oxide, oxynitride or nitride of the (semi)metal M and especially consists of these phases;
which is obtainable by calcining the inventive nanocomposite material obtained by copolymerization with substantial or complete exclusion of oxygen. Here too, phase arrangement and particle size are substantially maintained in the course of calcination. Such materials are novel and likewise form part of the subject matter of the present invention.

The particle sizes of the particulate nanocomposite material are within the ranges specified above for the nanocomposite material obtainable in accordance with the invention.

In the carbon-containing nanocomposite material, the carbon phase C and the inorganic phase form essentially co-continuous phase domains, and the mean distance between two adjacent domains of identical phases will generally not exceed a mean value of 100 nm, frequently 40 nm, particularly 10 nm and especially not more than 5 nm.

In general, the calcination or carbonization is performed at a temperature in the range from 400 to 1500° C., especially in the range from 500 to 1000° C.

The calcination or carbonization is then effected typically with substantial exclusion of oxygen. In other words, during the calcination or carbonization, the partial oxygen pressure in the reaction zone in which the calcination is performed is low and will preferably not exceed 20 mbar, especially 10 mbar. The calcination is preferably performed in an inert gas atmosphere, for example under nitrogen or argon. The inert gas atmosphere will preferably comprise less than 1% by volume, especially less than 0.1% by volume, of oxygen. In a likewise preferred embodiment of the invention, the calcination is performed under reducing conditions, for example in an atmosphere which comprises hydrogen ($H_2$), hydrocarbon gases such as methane, ethane or propane, or ammonia ($NH_3$), optionally as a mixture with inert gases such as nitrogen or argon.

To remove volatile constituents, the calcination or carbonization can be performed in an inert gas stream or in a gas stream which comprises reducing gases such as hydrogen, hydrocarbon gases or ammonia.

The inventive nanocomposite material can also be converted to particulate carbon. For this purpose, the particulate nanocomposite material obtainable by the polymerization process according to the invention is calcined or carbonized with substantial exclusion of oxygen in the manner described above. It is possible to leach the oxide phase out of the particulate nanocomposite material obtained, which comprises the carbon phase C and at least one inorganic phase of a (semi)metal oxide, oxynitride or nitride of the (semi)metal M and especially consists of these phases, for example by treatment with aqueous hydrogen fluoride solution. This gives an extremely porous carbon material which is particularly suitable, for example, for storage or filtration of gases, for example hydrogen, natural gas, and especially methane.

The examples which follow serve to illustrate the invention. The following feedstocks were used.
Emulsifier 1: sodium salt of bis(2-ethylhexyl)-2-sulfosuccinic acid (Aerosil OT 100)
Emulsifier 2: sodium laurylsulfate
Fumed silica: primary particle size 7 nm, BET surface area 300 m$^2$/g (Aerosil® 300 SP, Evonik)
Oligoisobutenyldichloromethylsilane: alkyldichloromethylsilane in which the alkyl radical is an oligoisobutenyl radical with a number-average molecular weight of about 1000 daltons (approx. 17.8 isobutene repeat units).

PREPARATION EXAMPLE 1

2,2'-Spirobis[4H-1,3,2-benzodioxasilin] (BIS)

135.77 g of salicyl alcohol (1.0937 mol) were dissolved in anhydrous toluene at 85° C. Subsequently, 83.24 g (0.5469 mol) of tetramethoxysilane (TMOS) were slowly added dropwise, in the course of which, after addition of one third of TMOS, 0.3 ml of tetra-n-butylammonium fluoride (1 M in THF) was injected all at once. The mixture was stirred at 85°

C. for 1 h and then the methanol/toluene azeotrope was distilled off (63.7° C.). The remaining toluene was removed on a rotary evaporator. The product was removed from the resulting reaction mixture with n-hexane at ≈70° C. After cooling to 20° C., the clear solution was decanted off. After removing the n-hexane, the title compound remained as a white solid. The product can be purified further to remove impurities by dissolving in toluene and reprecipitating with n-hexane.

$^1$H NMR (400 MHz, CDCl$_3$, 25° C., TMS) δ [ppm]=5.21 (m, 4H, CH$_2$), 6.97-7.05 (m, 6H), 7.21-7.27 (M, 2H).

$^{13}$C NMR (100 MHz, CDCl$_3$, 25° C., TMS): δ [ppm]=66.3 (CH$_2$), 119.3, 122.3, 125.2, 125.7, 129.1, 152.4.

$^{29}$Si—CP-MAS (79.5 MHz): δ [ppm]=−78.4

PREPARATION EXAMPLE 2

2-Methyl-2-octadecyl-[4H-1,3,2-benzodioxasilin]

In a 1 l four-neck flask with stirrer, reflux condenser and dropping funnel, 31.7 g of salicyl alcohol (0.25 mol) and 66.7 g (0.52 mol) of dried N-ethyldiisopropylamine were suspended under argon in 100 ml of anhydrous toluene at 22° C. Octadecylmethyldichlorosilane (95%) was melted and dissolved in 100 ml of dry toluene. This solution was added dropwise at 23 to 27° C. over 55 minutes, in the course of which an exothermic reaction was observed. By cooling with an ice bath, the reaction temperature was kept at not more than 27° C. After the addition had ended, the temperature was raised to 40° C., in the course of which exothermicity (without heating to 45° C.) was again observed. The reaction vessel was then cooled to 40° C. with cold water, and the mixture was stirred at this temperature for one hour and then cooled to RT. The suspension was left to stand at RT overnight. The precipitate (hydrochloride) was filtered off with suction under N$_2$ through a P40 glass frit, and the filtrate was concentrated by rotary evaporation at 120° C./5 mbar. Yield 80.9 g (77% of theory)

PREPARATION EXAMPLE 3

2-Methyl-2-oligo(isobutenyl)-[4H-1,3,2-benzodioxasilin]

In a 2 l four-neck flask with stirrer, reflux condenser and dropping funnel, 12.5 g of salicyl alcohol (0.1 mol) and 26 g (0.2 mol) of dried N-ethyldiisopropylamine were suspended under argon in 150 ml of anhydrous toluene at 22° C. By means of the dropping funnel, a mixture of 110 g (0.1 mol) of oligoisobutenyldichloromethylsilane and 100 ml of toluene was added dropwise thereto at 22° C. within 70 min. In the course of this, the internal temperature rose to not more than 27.4° C. As early as after ⅔ of the addition, no further exothermicity was observed and the rest was added rapidly. The mixture was stirred at RT for 90 min and then heated to 80° C. (internal temperature). The mixture was allowed to cool to 22° C. with stirring, and the precipitated hydrochloride was filtered off by means of a suction filter. The toluene solution is then concentrated by rotary evaporation at 120° C. and 5 mbar to obtain 78 g (67% of theory) of the title compound in the form of a solid material.

POLYMERIZATION EXAMPLES

Comparative Examples 1 to 4

Under inert conditions, 2 g of BIS were dissolved in 4.5 g of anhydrous toluene with stirring in a reaction vessel closable with a septum. By means of a syringe, the amount of methanesulfonic acid specified in the following list was added dropwise thereto at 22° C. with stirring, and the mixture was left to stir for a further 30 min. As early as after 5 minutes, the reaction mixture was solid in all cases.

Comparative example 1: 500 mg of methanesulfonic acid
Comparative example 2: 1000 mg of methanesulfonic acid
Comparative example 3: 200 mg of methanesulfonic acid
Comparative example 4: 75 mg of methanesulfonic acid

Example 1

Under inert conditions, 1.5 g of BIS were dissolved in 10.5 g of anhydrous toluene in a reaction vessel equipped with a high-performance disperser (Ultra-Turrax® T25 Basic, IKA), and 0.25 g of emulsifier 1 was added thereto. By means of a syringe, 75 mg of methanesulfonic acid were added dropwise thereto at 24 000 rpm and 22° C., and the mixture was left to stir at 24 000 rpm for a further 60 min and with a magnetic stirrer for a further 4 h. In this way, the polymer was obtained as a redispersible precipitate.

The weight-average particle diameter ($d_{50}$), determined by means of an ultracentrifuge on a 1.6% by weight sample of the polymer in toluene, was 38 nm; the $d_{90}$ measured under these conditions was 78 nm.

Example 2

The experiment was performed in the manner described in example 1, except that the same amount of emulsifier 2 was used in place of emulsifier 1. In this way, the polymer was obtained as a redispersible precipitate.

The weight-average particle diameter ($d_{50}$), determined by light scattering on a 0.8% by weight sample of the polymer in toluene, was 22 nm; the $d_{90}$ measured under these conditions was 60 nm.

Example 3

Under inert conditions, 4.5 g of a 32.5% by weight solution of BIS in toluene were mixed with 7.2 g of anhydrous toluene in a reaction vessel equipped with a high-performance disperser (Ultra-Turrax® T25 Basic, IKA) and 0.375 g of 2-methyl-2-octadecyl-[4H-1,3,2-benzodioxasilin] from preparation example 2 was added thereto. By means of a syringe, 75 mg of methanesulfonic acid were added dropwise thereto at 24 000 rpm and 22° C., and the mixture was left to stir at 24 000 rpm for a further 120 min and with a magnetic stirrer for a further 4 h. In this way, the polymer was obtained as a redispersible precipitate.

The weight-average particle diameter ($d_{50}$), determined by means of an ultracentrifuge on a 0.9% by weight sample of the polymer in toluene, was 373 nm; the $d_{90}$ measured under these conditions was 553 nm.

Example 4

Under inert conditions, 1.5 g of BIS were dissolved in 10.5 g of anhydrous toluene in a reaction vessel equipped with a high-performance disperser (Ultra-Turrax® T25 Basic, IKA), and 0.375 g of 2-methyl-2-oligo(isobutenyl)-[4H-1,3,2-benzodioxasilin] from preparation example 3 was added thereto. By means of a syringe, 75 mg of methanesulfonic acid were added dropwise thereto at 24 000 rpm and 22° C., and the mixture was left to stir at 24 000 rpm for a further 120 min. In this way, the polymer was obtained as a redispersible precipitate.

The weight-average particle diameter ($d_{50}$ value), determined by means of an ultracentrifuge on a 0.9% by weight sample of the polymer in toluene, was 504 nm; the $d_{90}$ measured under these conditions was 1234 nm.

Example 5

Under inert conditions, 3.3 g of dried fumed silica (dried at 250° C. and 15 mbar for 16 h) were suspended in 250 g of anhydrous toluene in a vessel equipped with a magnetic stirrer. A solution of 198 mg of methanesulfonic acid in 43.57 g of toluene was added thereto with stirring at 22° C., the mixture was stirred at 22° C. for 15 min, and then the suspension was treated in an ultrasound bath for 15 min. Subsequently, a mixture of 20.24 g of a 32.5% by weight solution of BIS in toluene and 43.57 g of anhydrous toluene was added dropwise thereto at 22° C. with stirring, and, after the addition had ended, the mixture was left to stir at 22° C. for a further 6 h. In this way, the polymer was obtained in the form of a pink suspension in toluene.

Example 6

Under inert conditions, 13.5 g of a 32.5% by weight solution of BIS in toluene were mixed with 21.6 g of anhydrous toluene in a reaction vessel equipped with a high-performance disperser (Ultra-Turrax® T25 Basic, IKA), and 0.735 g of emulsifier 2 was added thereto. By means of a syringe, 225 mg of methanesulfonic acid were added dropwise thereto at 24 000 rpm and 22° C., and the mixture was left to react at 24 000 rpm for a further 120 min. In this way, the polymer was obtained as a redispersible precipitate.

Example 7

A 2 l three-neck flask with an MIG stirrer (400 rpm), thermometer, reflux condenser and stopper was initially charged with 750 g of dry toluene at 22° C. and, while gently purging with nitrogen, 300 g of a 36% by weight solution of the monomer BIS in toluene were added. Subsequently, a syringe was used to add, through a septum stopper, 8.1 g of methanesulfonic acid within 30 seconds. After an induction phase, in which the primary observation was slight turbidity in the flask, a red-violet solid began to precipitate out. During this precipitation, there was slight exothermicity and the temperature rose to approx. 35° C. After 3 hours, a solution of 5.4 parts sodium dodecylsulfate in 5 parts toluene was then added and the mixture was stirred for a further 1 h.

To transfer the polymer from the toluene phase to the water phase, 500 g of the above suspension were stirred with 460 g of water at 22° C. Subsequently, 60 g of a 25% aqueous sodium hydroxide solution were added dropwise by means of a dropping funnel, while stirring at 400 rpm. The pH rose from originally strongly acidic to a pH of 11.1. To remove the toluene phase, the mixture was transferred to a separating funnel. Subsequently, the aqueous phase was centrifuged. This gave a dark brown aqueous dispersion, the particles of which had a weight-average particle size of 13.3 nm (measured with the aid of light scattering). The solids content of the dispersion was 12.9% by weight.

The dispersion thus obtained was analyzed by means of cryo-TEM. For this purpose, samples of the dispersion were shock-frozen and first analyzed by means of a transmission electron microscope (CM120, LaB6 cathode). This confirmed the particle size. A further TEM analysis was performed in the form of HAADF-STEM (High Angle Annular Dark Field—Scanning Transmission Electron Microscopy) with a Tecnai F20 FEG-TEM (FEI, Eindhoven, The Netherlands) at a working voltage of 200 kV. Virtually round particles with diameters of approx. 5-30 nm were observed. The particles are present partly in isolated form, but they usually form a kind of network which has probably formed as a result of ice crystallization in the course of freezing, i.e. is an artifact of freezing. The sample analyzed by means of EDXS (Energy Dispersive X-Ray Spectroscopy (Z>8)) showed that the particles were present predominantly as C/Si/O hybrid particles which were probably still frequently surrounded by the Na/S-containing soap.

The invention claimed is:

1. A process for producing a particulate nanocomposite material which comprises particles that comprise
    a) at least one inorganic or organo(semi)metallic phase which comprises at least one (semi)metal M; and
    b) at least one organic polymer phase;
    said process comprising polymerizing at least one monomer MM which comprises:
    at least one first cationically polymerizable monomer unit A which has a metal or semimetal M, and
    at least one second cationically polymerizable organic monomer unit B which is joined to the polymerizable unit A via one or more covalent chemical bonds,
    under cationic polymerization conditions under which both the polymerizable monomer unit A and the polymerizable organic monomer unit B polymerize with breakage of the bond between A and B,
    wherein the polymerization is performed in an aprotic solvent in which the nanocomposite material is insoluble, in the presence of at least one polymerization initiator and of at least one further substance selected from
    α) at least one surface-active substance and
    β) at least one particulate material,
    or wherein the polymerization is performed in an aprotic solvent in which the nanocomposite material is insoluble, in the presence of at least one polymerization initiator, or the polymerization product is treated in the presence of at least one surface-active substance with a solution of a base in a protic solvent.

2. The process according to claim 1, wherein the polymerization of the at least one monomer MM is performed in the presence of at least one surface-active compound.

3. The process according to claim 2, wherein the surface-active compound has at least one hydrocarbon radical having at least 6 carbon atoms or at least one oligo- or poly(alkylsiloxane) group and at least one anionic or nonionic polar group.

4. The process according to claim 3, wherein the surface-active compound has at least one alkyl group having at least 6 carbon atoms and at least one sulfonate group.

5. The process according to claim 2, wherein the surface-active compound has at least one alkyl group having at least 6 carbon atoms and at least one cationically polymerizable group which is copolymerizable with the monomer unit A and/or B.

6. The process according to claim 2, wherein the surface-active compound is present in an amount of 0.5 to 50% by weight, based on the total amount of the monomers MM.

7. The process according to claim 2, wherein the surface-active compound is added before the polymerization initiator.

8. The process according to claim 1, wherein the polymerization of the at least one monomer MM is performed in the presence of at least one particulate material.

9. The process according to claim 8, wherein the particulate material has a primary particle size, determined by light scattering, in the range from 1 to 2000 nm.

10. The process according to claim 8, wherein the particulate material comprises at least a portion of the polymerization initiator.

11. The process according to claim 8, wherein the particulate material is a (semi)metal oxide.

12. The process according to claim 11, wherein the particulate material is a silica.

13. The process according to claim 8, wherein the particulate material is present in an amount of 1 to 10 000 parts by weight per 100 parts by weight of the at least one monomer MM.

14. The process according to claim 8, wherein the at least one monomer MM is added under polymerization conditions to a suspension of the particulate material in the organic solvent.

15. The process according to claim 1, wherein the polymerization is performed in an aprotic solvent in which the nanocomposite material is insoluble, in the presence of at least one polymerization initiator, and the polymerization product is treated in the presence of at least one surface-active substance with a solution of a base in a protic solvent.

16. The process according to claim 15, wherein the protic solvent is water.

17. The process according to claim 15, wherein the base is selected from the group consisting of alkali metal hydroxides, alkaline earth metal hydroxides and ammonium hydroxides.

18. The process according to claim 15, wherein the surface-active substance has at least one alkyl group having at least 6 carbon atoms and at least one sulfonate group.

19. The process according to claim 1, wherein the metal or semimetal M is selected from the group consisting of B, Al, Si, Ti, Zr, Hf, Ge, Sn, Pb, V, As, Sb, Bi and mixtures thereof.

20. The process according to claim 19, wherein the metal or semimetal M of the monomer unit A comprises silicon in an amount of at least 90 mol%, based on the total amount of M.

21. The process according to claim 1, wherein the one or more monomer MM is described by the general formula I:

$$R^1-Q\underset{G}{\overset{M}{\diagdown}}\underset{(Y-R^{2'})_q}{\overset{X-R^{1'}}{\diagup}} \quad (I)$$

in which

M is a metal or semimetal;

$R^1$, $R^2$ may be the same or different and are each an Ar—C($R^a$,$R^b$)— radical in which Ar is an aromatic or heteroaromatic ring which optionally has 1 or 2 substituents selected from halogen, CN, $C_1$-$C_6$-alkyl, $C_1$-$C_6$-alkoxy and phenyl, and $R^a$, $R^b$ are each independently hydrogen or methyl or together are an oxygen atom or a methylidene group (=$CH_2$), or the $R^1Q$ and $R^2G$ radicals together are a radical of the formula A $$\text{(A)}$$

in which A is an aromatic or heteroaromatic ring fused to the double bond, m is 0, 1 or 2, the R radicals may be the same or different and are selected from halogen, CN, $C_1$-$C_6$-alkyl, $C_1$-$C_6$-alkoxy and phenyl, and $R^a$, $R^b$ are each as defined above;

G is O, S or NH;

Q is O, S or NH;

q according to the valency of M is 0, 1 or 2,

X, Y may be the same or different and are each O, S, NH or a chemical bond;

$R^{1'}$, $R^{2'}$ may be the same or different and are each $C_1$-$C_6$-alkyl, $C_3$-$C_6$-cycloalkyl, aryl or an Ar'—C($R^{a'}$, $R^{b'}$)— radical in which Ar' is as defined for Ar and $R^{a'}$, $R^{b'}$ are each as defined for $R^a$, $R^b$, or $R^{1'}$, $R^{2'}$ together with X and Y are a radical of the formula A, as defined above, or, when X is oxygen, the $R^{1'}$ radical may be a radical of the formula:

$$R^1-Q\underset{G}{\overset{M}{\diagdown}}\underset{(Y-R^{2'})_q}{\overset{\#}{\diagup}}$$

in which q, $R^1$, $R^2$, $R^{2'}$, Y, Q and G are each as defined above and # is the bond to X.

22. The process according to claim 21, wherein the one or more monomer MM to be polymerized comprises at least one monomer of the general formula II:

$$\text{(II)}$$

in which

M is a metal or semimetal;

A and A' are each independently an aromatic or heteroaromatic ring fused to the double bond;

m and n are each independently 0, 1 or 2;

G and G' are the same or different and are each independently O, S or NH;

Q and Q' are the same or different and are each independently O, S or NH;

R and R' are the same or different and are each independently selected from halogen, CN, $C_1$-$C_6$-alkoxy and phenyl; and $R^a$, $R^b$, $R^{a'}$, $R^{b'}$ are each independently selected from hydrogen and methyl, or $R^a$ and $R^b$ and/or $R^{a'}$ and $R^{b'}$ in each case together are an oxygen atom.

23. The process according to claim 21, wherein one or more monomer MM to be polymerized comprises at least one monomer of the general formula IV:

$$\text{(IV)}$$

in which

M is a metal or semimetal;

Ar and Ar' are the same or different and are each independently an aromatic or heteroaromatic ring which optionally has 1 or 2 substituents selected from the group consisting of halogen, CN, $C_1$-$C_6$-alkyl, $C_1$-$C_6$-alkoxy and phenyl;

$R^a$, $R^b$, $R^{a'}$, and $R^{b'}$ each independently selected from hydrogen and methyl, or $R^a$ and $R^b$ and/or $R^{a'}$ and $R^{b'}$ in each case together are an oxygen atom;

q according to the valency of M is 0, 1 or 2;

X and Y may be the same or different and are each O, S, NH or a chemical bond; and $R^{1'}$ and $R^{2'}$ may be the same or different and are each $C_1$-$C_6$-alkyl, $C_3$-$C_6$-cycloalkyl, aryl or an Ar"—C($R^{a''}$, $R^{b''}$)—radical in which Ar" is as defined for Ar and $R^{a'}$, $R^{b''}$ are each as defined for $R^a$, $R^b$, or $R^{1'}$, $R^{2'}$ together with X and Y are a radical of the formula A as defined above.

24. The process according to claim 23, wherein one or more monomers of the formula IV is a compound of the general formula V:

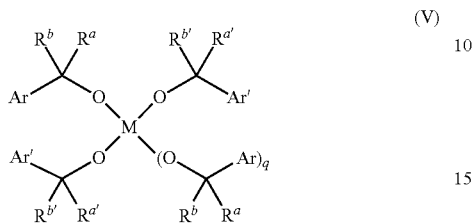

(V)

wherein

M is a metal or semimetal;

Ar, Ar' are the same or different and are each an aromatic or heteroaromatic ring which optionally has 1 or 2 substituents selected from halogen, CN, $C_1$-$C_6$-alkyl, $C_1$-$C_6$-alkoxy and phenyl;

$R^a$, $R^b$, $R^{a'}$, $R^{b'}$ are each independently selected from hydrogen and methyl, or $R^a$ and $R^b$ and optionally $R^{a'}$ and $R^{b'}$ in each case together are an oxygen atom; and q according to the valency of M is 0, 1 or 2.

* * * * *